United States Patent
Horibe et al.

(10) Patent No.: US 11,919,107 B2
(45) Date of Patent: Mar. 5, 2024

(54) TOOL STORAGE, MACHINE TOOL, HYBRID WORKING MACHINE

(71) Applicant: Yamazaki Mazak Corporation, Niwa-gun (JP)

(72) Inventors: Kazuya Horibe, Niwa-gun (JP); Seiichi Yoshida, Niwa-gun (JP); Keigo Murakami, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 500 days.

(21) Appl. No.: 17/154,979

(22) Filed: Jan. 21, 2021

(65) Prior Publication Data
US 2021/0138598 A1    May 13, 2021

Related U.S. Application Data

(63) Continuation of application No. PCT/JP2018/033103, filed on Sep. 6, 2018.

(51) Int. Cl.
*B23K 26/70*     (2014.01)
*B23Q 11/08*     (2006.01)
*B33Y 30/00*     (2015.01)

(52) U.S. Cl.
CPC ............ *B23K 26/702* (2015.10); *B23Q 11/08* (2013.01); *B33Y 30/00* (2014.12); *Y10T 483/115* (2015.01); *Y10T 483/18* (2015.01)

(58) Field of Classification Search
CPC ...... B23Q 3/15526; B23Q 2003/15527; B23Q 2003/15528; B23Q 2003/15532;
(Continued)

(56) References Cited

U.S. PATENT DOCUMENTS 4,658,494 A      4/1987  Ohtani et al.
4,780,952 A  *  11/1988  Babel ................. B23Q 3/15539
                                                    483/68
(Continued)

FOREIGN PATENT DOCUMENTS

CN      101386139        3/2009
CN      204339401 U      5/2015
(Continued)

OTHER PUBLICATIONS

International Search Report for corresponding International Application No. PCT/JP2018/033103, dated Oct. 23, 2018.
(Continued)

*Primary Examiner* — Sunil K Singh
*Assistant Examiner* — Michael Vitale
(74) *Attorney, Agent, or Firm* — MORI & WARD, LLP

(57) ABSTRACT

A tool storage includes a tool magazine, a magazine mover, and a storage device cover. The tool magazine includes a plurality of tool holding members which are provided in the tool magazine and which are configured to hold a tool. The magazine mover is provided outside the tool magazine and is configured to move the tool magazine in a moving direction between an exchange position at which the tool is exchanged and a storage position at which the tool is stored. The storage device cover is provided to arrange the tool magazine and the magazine mover in the tool storage. The plurality of tool holding members are arranged in the moving direction.

17 Claims, 21 Drawing Sheets

(58) Field of Classification Search
CPC .. B23Q 2003/15537; B23Q 2003/1553; B23Q 2003/15531; B23Q 11/08; B23Q 11/0891; Y10T 483/115; Y10T 483/179; Y10T 483/1793; Y10T 483/1795; Y10T 483/18
USPC .................................. 483/3, 54, 55, 56, 58
See application file for complete search history.

(56) References Cited

U.S. PATENT DOCUMENTS

| | | | | |
|---|---|---|---|---|
| 5,300,006 | A * | 4/1994 | Tanaka | B23Q 3/15706 483/67 |
| 5,672,145 | A * | 9/1997 | Pollington | B23Q 3/15706 483/65 |
| 6,116,616 | A | 9/2000 | Bratten | |
| 2002/0028735 | A1 | 3/2002 | Hans-Dieter | |
| 2005/0266974 | A1 | 12/2005 | Yamazaki et al. | |
| 2007/0000888 | A1 | 1/2007 | Yamazaki et al. | |
| 2009/0075795 | A1 | 3/2009 | Okabe et al. | |
| 2013/0029817 | A1 * | 1/2013 | Yellin | B23Q 3/15706 483/59 |
| 2013/0203572 | A1 | 8/2013 | Denkmeier | |
| 2013/0331245 | A1 * | 12/2013 | Koike | B23Q 3/15706 483/54 |
| 2017/0326700 | A1 * | 11/2017 | Morimura | B23Q 1/76 |
| 2018/0036835 | A1 | 2/2018 | Kamigawara et al. | |
| 2018/0222002 | A1 | 8/2018 | Kasahara | |
| 2018/0250784 | A1 * | 9/2018 | Kasahara | B23Q 3/15546 |
| 2019/0151990 | A1 | 5/2019 | Mezawa et al. | |
| 2019/0351519 | A1 * | 11/2019 | Miyake | B23Q 7/00 |

FOREIGN PATENT DOCUMENTS

| | | |
|---|---|---|
| CN | 206335414 U | 7/2017 |
| CN | 207480224 U | 6/2018 |
| DE | 10354442 | 6/2005 |
| EP | 0949044 | 10/1999 |
| EP | 1179387 | 4/2004 |
| JP | 60-259344 | 12/1985 |
| JP | 62-050098 | 3/1987 |
| JP | 02-155585 | 6/1990 |
| JP | 07-112341 | 5/1995 |
| JP | 2001-138164 | 5/2001 |
| JP | 2005-088134 | 4/2005 |
| JP | 2005-334920 | 12/2005 |
| JP | 2006-102812 | 4/2006 |
| JP | 2011-230265 | 11/2011 |
| JP | 2013-538698 | 10/2013 |
| JP | 2018-024074 | 2/2018 |
| WO | WO 2016/203823 | 12/2016 |
| WO | WO 2017/017825 | 2/2017 |

OTHER PUBLICATIONS

Written Opinion for corresponding International Application No. PCT/JP2018/033103, dated Oct. 23, 2018.
Japanese Office Action for corresponding JP Application No. 2019-504994, dated Apr. 16, 2019 (w/ English machine translation).
European Office Action for corresponding EP Application No. 18932816.4-1016, dated Dec. 2, 2021.
Chinese Office Action for corresponding CN Application No. 201880091742.6, dated Mar. 1, 2021.
International Preliminary Report on Patentability with Translation of the Written Opinion for corresponding Internatinal Application No. PCT/JP2018/033103, dated Mar. 9, 2021.
European Search Report for corresponding EP Application No. 18932816.4-1016, dated May 11, 2021.
European Office Action for corresponding EP Application No. 18932816.4-1016, dated May 21, 2021.

* cited by examiner

TOOL STORAGE, MACHINE TOOL, HYBRID WORKING MACHINE

CROSS-REFERENCE TO RELATED APPLICATIONS

The present application is a continuation application of International Application No. PCT/JP2018/033103, filed Sep. 6, 2018. The contents of this application are incorporated herein by reference in their entirety.

BACKGROUND OF THE INVENTION

Field of the Invention

The present invention relates to a tool storage, a machine tool, and a hybrid working machine.

Discussion of the Background

As known in the art, there are techniques of cutting and hardening workpieces using laser beam, and additive manufacturing techniques of supplying additive material to a workpiece and radiating laser beam to the additive material to make the additive material fused and joined with the workpiece.

JP 2005-334920A discloses a tool station of a laser-beam working machine. The tool station includes tool change magazines each storing a laser machining tool. In the laser-beam working machine recited in JP 2005-334920A, the laser machining tools stored in the tool change magazines include an optical element such as a light concentration lens. In particular machining situations, the laser-beam working machine exchanges the laser machining tool mounted on the machining head with the laser machining tool including the optical element.

SUMMARY OF THE INVENTION

According to a first aspect of the present invention, a tool storage includes a tool magazine, a magazine mover, and a storage device cover. The tool magazine includes a plurality of tool holding members which are provided in the tool magazine and which are configured to hold a tool. The magazine mover is provided outside the tool magazine and is configured to move the tool magazine in a moving direction between an exchange position at which the tool is exchanged and a storage position at which the tool is stored. The storage device cover is provided to arrange the tool magazine and the magazine mover in the tool storage. The plurality of tool holding members are arranged in the moving direction.

According to a second aspect of the present invention, a machine tool includes a tool storage, a machining head, a machining head mover, a machine tool controller, and a wall. The tool storage includes a tool magazine and a magazine mover. The tool magazine includes a plurality of tool holding members which are provided in the tool magazine and which are configured to hold a tool. The magazine mover is provided outside the tool magazine and is configured to move the tool magazine in a moving direction between an exchange position and a storage position. The plurality of tool holding members are arranged in the moving direction. The machining head is configured to perform machining with the tool mounted on the machining head. The machining head mover is configured to move the machining head. The machine tool controller is configured to control the machining head mover and the magazine mover to move the tool magazine from the storage position to the exchange position. The wall has a cover opening and disposed between a storage region in which the tool is stored and an in-machining region in which the machine tool performs the machining using the tool. The tool magazine has a magazine opening which faces the wall and which overlaps the cover opening at the exchange position and does not overlap the cover opening at the storage position.

According to a third aspect of the present invention, a hybrid working machine includes a tool storage, a machining head, a machining head mover, a tool spindle, a tool spindle mover, a controller, and a wall. The tool storage includes a tool magazine and a magazine mover. The tool magazine includes a plurality of tool holding members which are provided in the tool magazine and which are configured to hold a laser machining tool for laser machining. The magazine mover is disposed outside the tool magazine and is configured to move the tool magazine in a moving direction between an exchange position and a storage position. The plurality of tool holding members are arranged in the moving direction. The machining head is configured to perform laser machining with the laser machining tool mounted on the machining head. The machining head mover is configured to move the machining head. The tool spindle is configured to perform cutting with a cutting tool for the cutting mounted on the tool spindle. The tool spindle mover is configured to move the tool spindle. The controller is configured to control the machining head mover and the magazine mover to move the tool magazine from the storage position to the exchange position. The wall has a cover opening and disposed between an in-machining region in which the hybrid working machine performs the laser machining using the laser machining tool and a storage region in which the laser machining tool is stored. The tool magazine has a magazine opening which faces the wall and which overlaps the cover opening at the exchange position and does not overlap the cover opening at the storage position.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a perspective view of a tool magazine 210 as seen from the side of a magazine opening 210a;

FIG. 6 is a perspective view of the tool magazine 210 as seen from the side of the magazine opening 210a;

DESCRIPTION OF THE EMBODIMENTS

Figure 1:
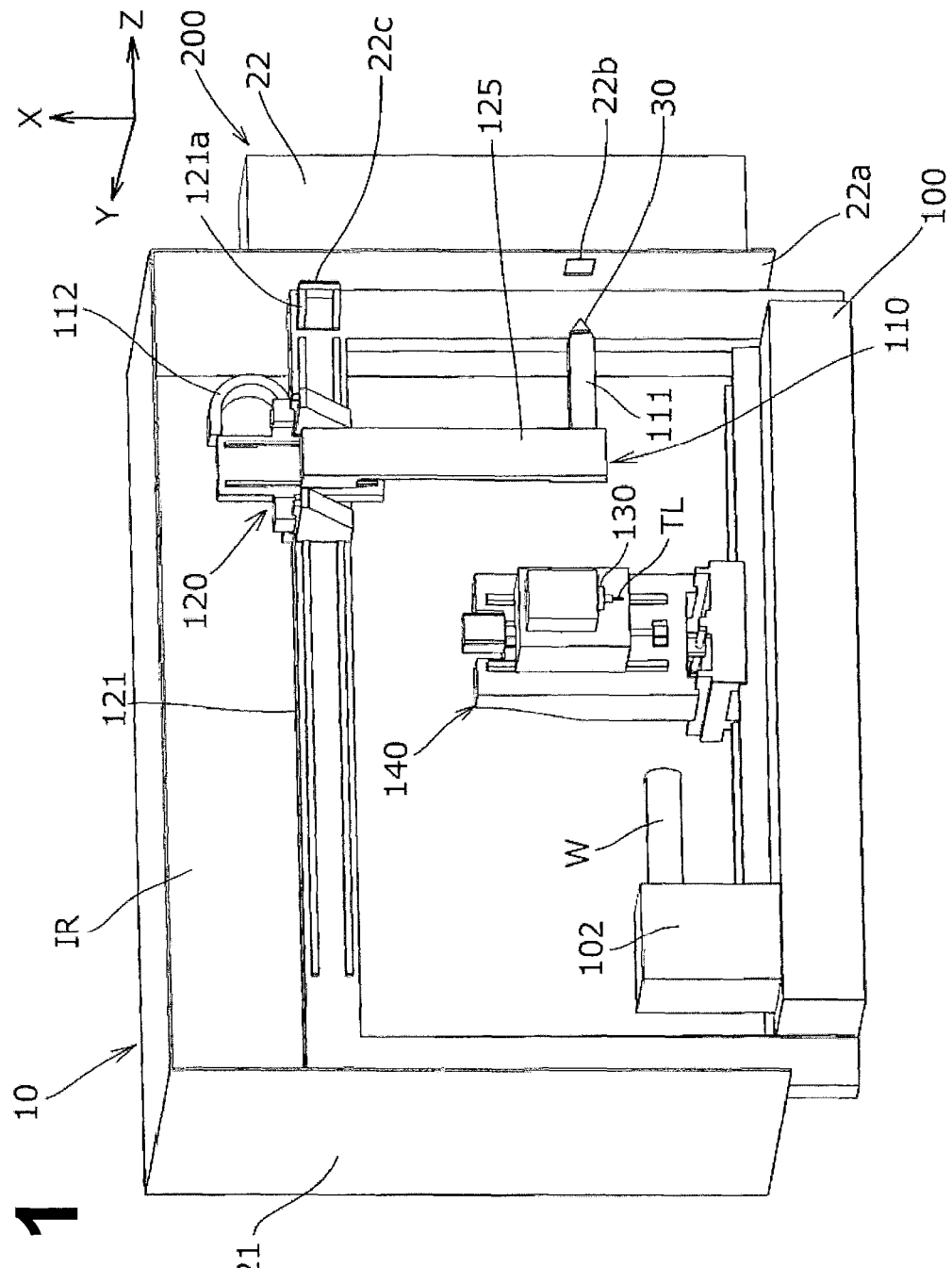
FIG. 1 is a perspective view a hybrid working machine 10 with a front part of a body cover 21 removed.

The embodiments will now be described with reference to the accompanying drawings, wherein like reference numerals designate corresponding or identical elements throughout the various drawings.

Configuration of Hybrid Working Machine

Figure 2:
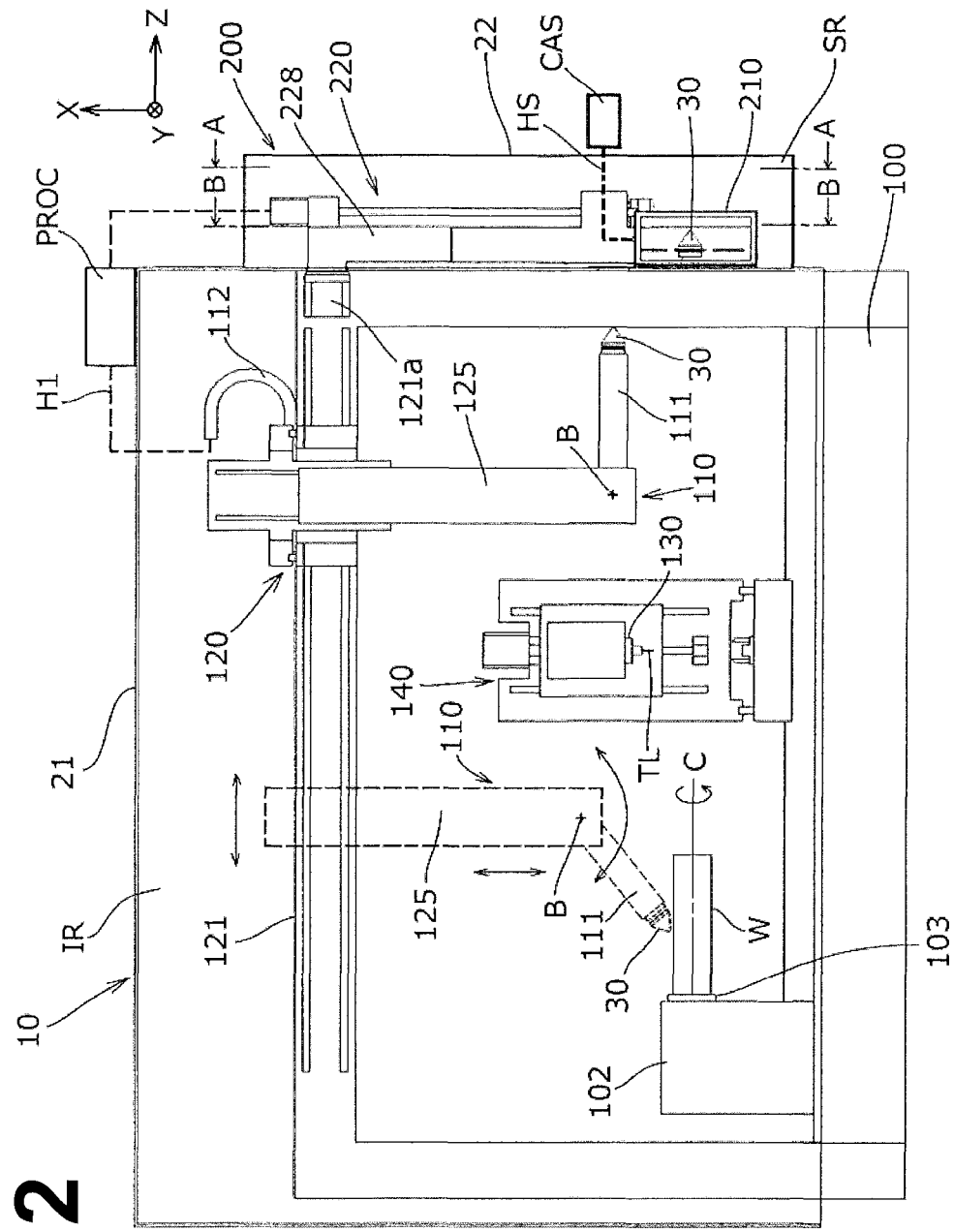
FIG. 2 is a front view of the hybrid working machine 10 with the front part of the body cover 21 and a front part of a storage device cover 22 removed.
Figure 3:
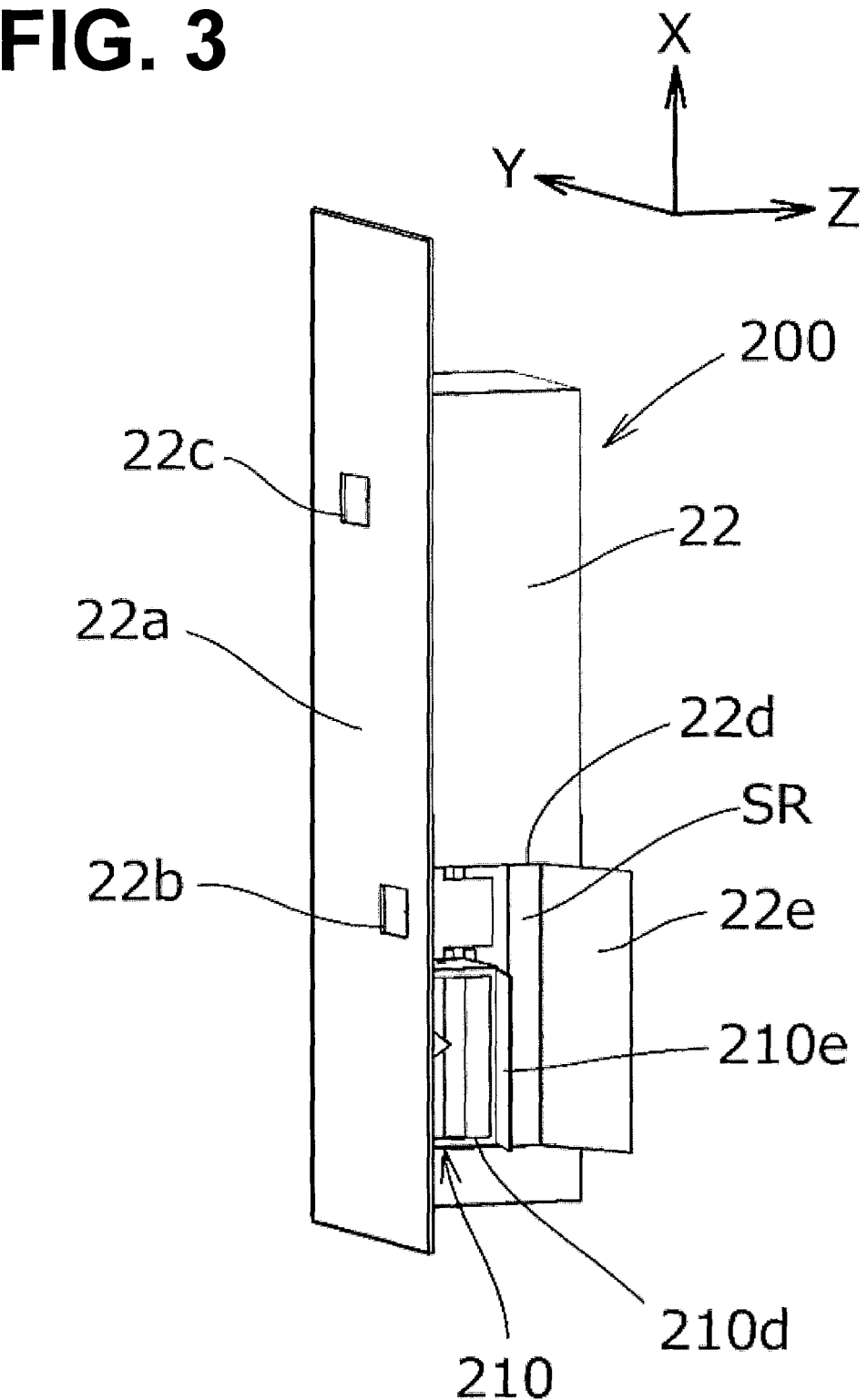
FIG. 3 is a perspective view of a tool storage 200 of the hybrid working machine 10 according to an embodiment.

FIG. 1 is a perspective view the hybrid working machine 10 with the front part of the body cover 21 removed. FIG. 2 is a front view of the hybrid working machine 10 with the front part of the body cover 21 and the front part of the storage device cover 22 removed, illustrating an internal structure of the hybrid working machine 10. FIG. 3 is a perspective view of the tool storage 200 of the hybrid working machine 10 according to this embodiment.

In the following description, the right or left direction of the hybrid working machine 10 will be referred to as Z axis direction, the depth direction of the hybrid working machine 10 will be referred to as Y axis direction, and the height direction of the hybrid working machine 10 will be referred to as X axis, direction.

As used herein, the term "additive manufacturing" is intended to mean a process of supplying an additive material to a workpiece and controlling a heat occurrence position by concentrating laser beam or another source of heat on a particular position on the workpiece, thereby selectively fusing the additive material and making the fused additive material joined with the workpiece. As used herein, the term "hybrid working machine" is intended to refer to a combination of a laser-beam working machine and one or a plurality of machine tools, examples of machine tools including, but not limited to, a milling machine, a cutting machine, an NC lathe, and a machining center.

Also as used herein, the term "storage position" is intended to mean a position of the tool magazine at which a tool is stored. Also as used herein, the term "exchange position" is intended to mean a position inside the tool magazine accessible by the machining head when transferring a tool; thus, the exchange position is different from the storage position.

In the hybrid working machine 10, an in-machining region IR and a storage region SR are defined. The in-machining region IR is defined by a base 100 and the body cover 21. The storage region SR is adjacent to the in-machining region IR and defined by the storage device cover 22. In the in-machining region IR, a plurality of regions are defined, one of the regions being a machining region in which a workpiece W is machined. The body cover 21 is mounted on the base 100 and covers the in-machining region IR's front side (omitted in FIG. 1), rear side, left side, and top side in FIG. 1. That is, in FIG. 1, the right side of the body cover 21 is open. The storage region SR is adjacent to the in-machining region IR, and contains the tool magazine 210, in which tools are stored, and a tool magazine drive mechanism 220. The storage device cover 22 covers the storage region SR's front and rear sides, right and left sides, and top and bottom sides. In particular, the wall 22a, which is a left-side part of the storage device cover 22 in FIG. 1, extends outward relative to the storage device cover 22 and covers the right-side opening of the body cover 21 in FIG. 1. Thus, the body cover 21 and the storage device cover 22 shield the respective internal spaces from the external environment.

As illustrated in the drawings, the hybrid working machine 10 includes, in the in-machining region IR: a workpiece holding mechanism 102, which holds the workpiece W; an additive manufacturing mechanism 110, which performs additive manufacturing with respect to the workpiece W; a first movement mechanism 120 (also referred to as machining head mover), which moves the additive manufacturing mechanism 110 relative to the workpiece W; a tool spindle 130, which performs cutting on the workpiece W; a second movement mechanism 140 (tool spindle mover), which moves the tool spindle 130 relative to the workpiece W; and the controller PROC (control circuit PROC), which controls motions of the tool storage 200 and the hybrid working machine 10. It is to be noted that the controller PROC is illustrated in FIG. 2 for descriptive purposes only and may not necessarily be positioned as illustrated; in FIG. 1, illustration of the controller PROC is omitted.

The workpiece holding mechanism 102 and the second movement mechanism 140 are disposed on the base 100.

The workpiece holding mechanism 102 includes, on its side surface, a workpiece holder 103 (FIG. 2) such as a chuck. The workpiece holder 103 is connected to a workpiece spindle (not illustrated) disposed inside the workpiece holding mechanism 102, which is driven and controlled by the control mechanism PROC. With this configuration, the workpiece holder 103 holds the workpiece W rotatably about C axis (FIG. 2).

The additive manufacturing mechanism 110 includes: the machining head 111, which is disposed at one end portion of an arm 125 of the first movement mechanism 120 and which is swingable about B axis (FIG. 2); and a transmission mechanism 112, which is connected to the machining head 111. The first movement mechanism 120 is capable of moving the machining head 111 relative to the workpiece W.

The machining head 111 includes, inside the machining head 111: a supplier that supplies an additive material such as metal wire and metal powder to the workpiece W; and a radiator that radiates, for example, laser beam to the workpiece W to which the additive material has been supplied. The supplier and radiator, however, are not illustrated.

The torch 30 (tool or laser machining tool) is detachably mounted on the leading end portion of the machining head 111. The torch 30 provides the additive material, supplied from the supplier, toward the workpiece, and includes an optical element that concentrates a light beam from the radiator. The torch 30 varies in beam diameter depending on the type of machining.

The transmission mechanism 112 includes, inside the transmission mechanism 112: a transmission path through which the additive material, an energy line, and gas and/or other resources used in additive manufacturing are transmitted; and a wiring H1 (FIG. 2), through which a driving signal is transmitted from the controller PROC to the first movement mechanism 120. The transmission mechanism 112 is mounted on and along a frame 121, which is disposed on the base 100.

The first movement mechanism 120, which will not be elaborated upon here, is capable of moving the machining head 111 of the additive manufacturing mechanism 110 in the Z axis direction, the Y axis direction, and the X axis direction relative to the frame 121 to any desired three-dimensional position.

Between the machining head 111 and the transmission mechanism 112, a transmission path (not illustrated) is disposed on a side surface of the arm 125 or inside the arm 125 so that the additive material, the energy line, and gas and/or other resources used in additive manufacturing are transmitted through the transmission path. This configuration ensures that electricity-related wirings and other wirings can be handled collectively as one unit in the transmission path, resulting in facilitated handling and maintenance.

The tool spindle 130 cuts the workpiece W using a cutting tool TL.

As used herein, the term "cutting" is intended to encompass "turning" and "milling", as representative examples. Also as used herein, the term "turning" is intended to mean a process of rotating a workpiece on the workpiece holder and machining the rotating workpiece using a turning tool mounted on the machining head. Also as used herein, the term "milling" is intended to mean a process of mounting a workpiece on the workpiece holder in a fixed or angle-indexed state and machining the workpiece by rotating a milling tool mounted on the machining head. This embodiment will be described under the assumption that milling is performed.

The second movement mechanism 140 is capable of moving the tool spindle 130 loaded with the cutting tool TL in the Z axis direction, the Y axis direction, and the X axis direction to any desired three-dimensional position. During the milling, the tool spindle 130 rotates the cutting tool TL, which is a milling tool in this embodiment.

Motions of Hybrid Working Machine

Next, example machining motions of the hybrid working machine 10 will be described. The machining by the hybrid working machine is performed in the in-machining region IR, which is isolated from the external environment.

The additive manufacturing mechanism 110 indicated by a dotted line in FIG. 2 is moved to a position near the workpiece W by the first movement mechanism 120, and performs additive manufacturing with respect to the workpiece W. Specifically, in response to a control signal from the controller PROC, the machining head 111 moves in three-dimensional directions and swings about the B axis, and the workpiece holding mechanism 102 rotates the workpiece W about the C axis. In this manner, the workpiece W is subjected to additive manufacturing at any desired position on the outer surface of the workpiece W to form any desired shape.

At the time of the additive manufacturing, the tool spindle 130 is moved to a position away from the workpiece W in the Z axis direction by the second movement mechanism 140, and turns into a waiting state (see FIGS. 1 and 2).

Upon completion of the additive manufacturing, the additive manufacturing mechanism 110 is, in response to a control signal from the controller PROC, moved to a position away from the workpiece W in the Z axis direction by the first movement mechanism 120, and turns into a waiting state (see FIG. 1).

When a cutting step is performed afterward, the tool spindle 130 is, in response to a control signal from the controller PROC, moved to a position near the workpiece W by the second movement mechanism 140, and cuts the workpiece W.

Machine Tool

The hybrid working machine 10 illustrated in FIGS. 1 and 2 with the tool spindle 130 and the second movement mechanism 140 omitted can be used as a machine tool that performs additive manufacturing or laser machining.

Configuration of Tool Storage

Next, the tool storage 200 will be described. The tool storage 200 includes: the storage device cover 22, which covers the storage region SR; and the tool magazine 210 and the tool magazine drive mechanism 220, which are contained in the storage region SR. As illustrated in FIGS. 1 to 3, the in-machining region IR and the storage region SR are partitioned from each other by the wall 22a, and the machining head 111 in the in-machining region IR is only accessible to the storage region SR through an access opening (cover opening) 22b, which is disposed on the wall 22a, to exchange the torch 30. The storage region SR is entirely covered by the storage device cover 22, which includes the wall 22a. It is to be noted that while in this embodiment the wall 22a is included in the storage device cover 22, the wall 22a may be a part of the body cover 21, for example. In this case, the wall 22a, which is a part of the body cover 21, cooperates with the storage device cover 22 to serve as a cover for the storage region SR.

In the tool storage 200, a magazine support frame 228 (FIG. 2) is disposed. The magazine support frame 228 is fixed to the frame 121. An upper end portion of the magazine support frame 228 is adjacent to an upper opening 22c (see FIG. 3) of the wall 22a, and is connected to a bracket 121a through the upper opening 22c. The bracket 121a is fixed to an upper portion of one end portion of the frame 121. It is to be noted that the gap between the upper opening 22c and the upper end portion of the magazine support frame 228 may be sealed so that no foreign matter passes through the gap. In the storage region SR, the magazine support frame 228 has a beam shape extending in the vertical direction (X axis direction).

Referring to FIG. 3, a take-out opening 22d is disposed on the front surface of the storage device cover 22. The take-out opening 22d is closable and openable by an outer door (second door) 22e, which is movable on a hinge of the storage device cover 22. In the storage region SR, the tool magazine 210 is disposed, as detailed later. By opening the outer door 22e, a worker is accessible to the tool magazine 210. There is no particular limitation to the tool storable in the tool magazine 210. It is to be noted, however, that when the tool has, in its laser emission path, an optical element such as a light concentration lens, there is a possibility of the optical element contaminated by foreign matter at and/or during storage of the tool. It is also to be noted that when the tool is covered by a protection window at an end portion of the laser emission path, as is the torch 30 (described later), there is a possibility of the protection window contaminated, preventing the laser beam or another source of heat from being transmitted and/or causing damage to the protection window itself. In light of the considerations above, the contamination prevention effect is increased by storing the tool in the tool magazine 210, in which no mover is disposed.

Figure 4A:
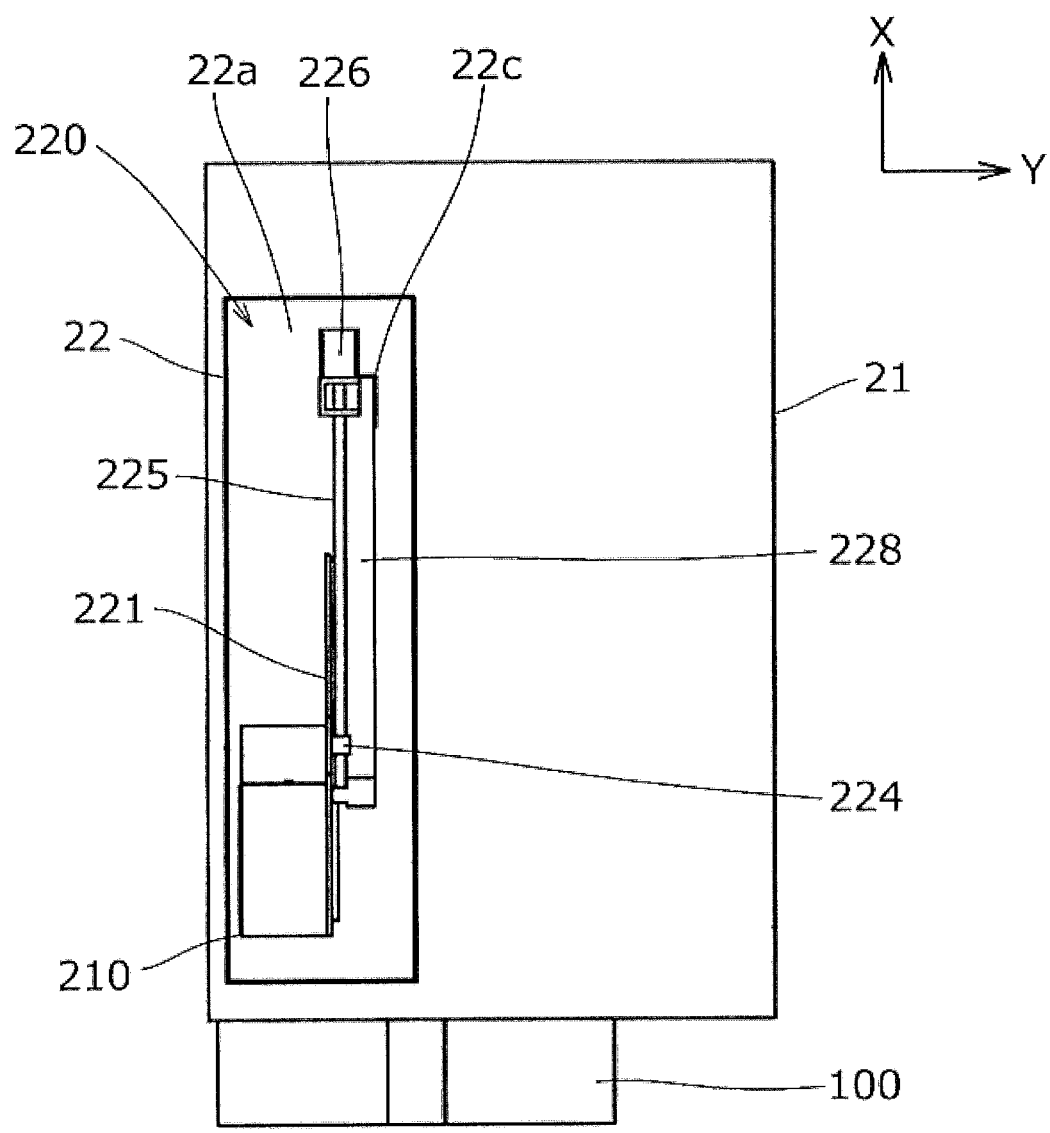
FIG. 4A is a right-side and cross-sectional view of the tool storage 200 along the A-A line illustrated in FIG. 2.
Figure 4B:
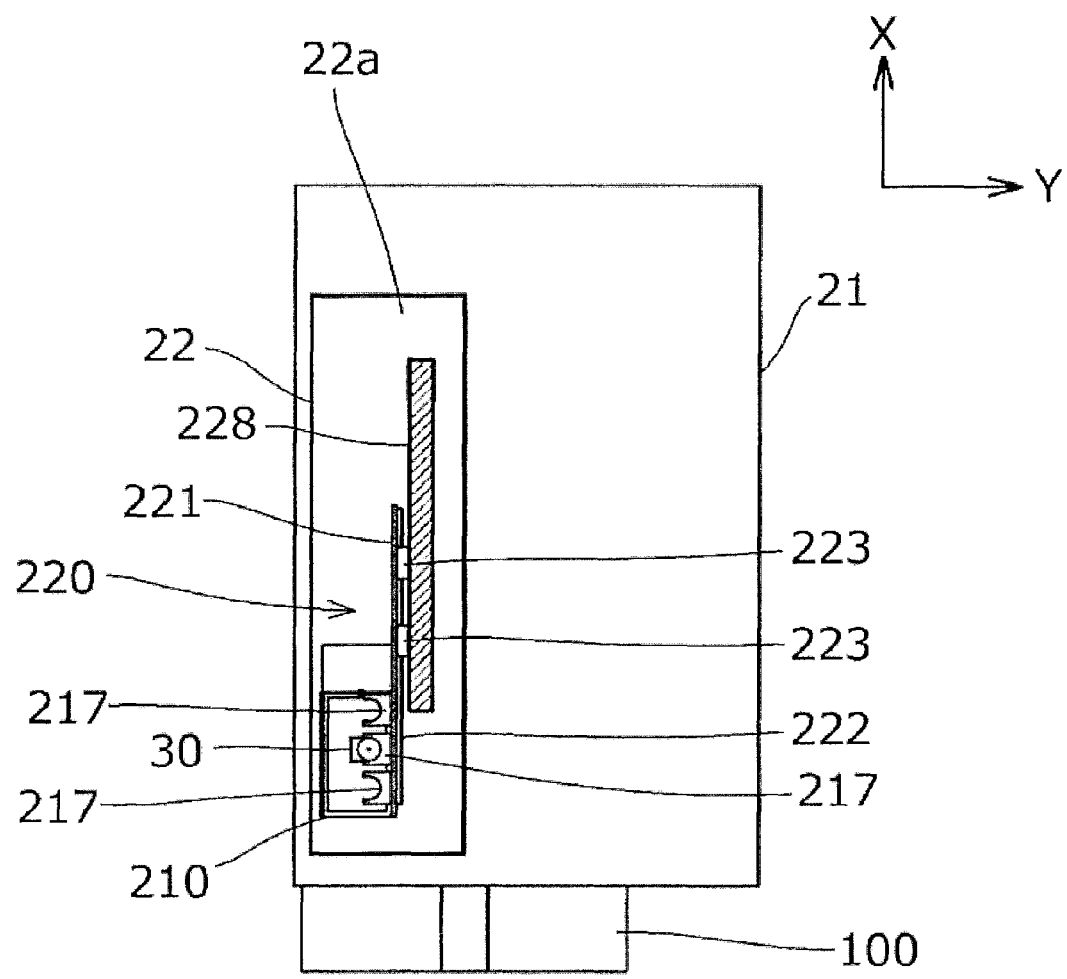
FIG. 4B is a right-side and cross-sectional view of the tool storage 200 along the B-B line illustrated in FIG. 2.

FIG. 4A is a right-side and cross-sectional view of the tool storage 200 along the A-A line illustrated in FIG. 2, and FIG. 4B is a right-side and cross-sectional view of the tool storage 200 along the B-B line illustrated in FIG. 2. As illustrated in FIGS. 4A, 4B, and 2, the tool storage 200 includes: the tool magazine 210, which has a box shape; and the tool magazine drive mechanism (magazine mover) 220, which is disposed outside the tool magazine 210 and moves the tool magazine 210 in the X axis direction. The tool magazine drive mechanism 220 also moves the tool magazine 210 between the exchange position, at which the tool is exchanged, and the storage position, at which the tool is stored. With the outer door 22e (FIG. 3) closed, the tool magazine 210 and the tool magazine drive mechanism 220 are covered by the storage device cover 22, which includes the wall 22a. It is to be noted that the inside of the tool magazine 210 may be sealed relative to the outside of the tool magazine 210.

As illustrated in FIGS. 4A and 4B, the tool magazine drive mechanism 220 includes: a connection plate 221, which is mounted on an outer surface of the tool magazine 210; a rail 222, which is mounted on the connection plate 221 and extends in the X axis direction; sliders 223, which is fixed to the magazine support frame 228; a ball nut 224, which is mounted on the connection plate 221; a screw shaft 225, which is disposed on the magazine support frame 228, extends in the X axis direction, and is screwed in the ball nut 224; and a servo motor 226, which is fixed to the magazine support frame 228 and drives the screw shaft 225 into rotation. The sliders 223 are movable in the X axis direction along the rail 222. The servo motor 226 is connected to the controller PROC via a wiring, not illustrated, and is controlled by the controller PROC to rotate positively or negatively. This enables the tool storage 200 to move the tool magazine 210 along the rail 222 using the tool magazine drive mechanism 220. Specifically, the tool storage 200 may move the tool magazine 210 using the tool magazine drive mechanism 220 between the exchange position, at which the tool is exchanged, and the storage position, at which the tool is stored. Therefore, the direction in which the tool magazine 210 is moved by the tool magazine drive mechanism 220 will not be limited to the X axis direction but may be the Y axis direction, the Z axis direction, or a synthesized direction of the foregoing directions. It is to be noted, however, that the direction in which the machining head 111, described later, makes access to the tool magazine 210 for tool exchange purposes is a direction crossing the movement direction of the tool magazine 210. It is to be noted that insofar as the tool magazine drive mechanism 220 is capable of moving and positioning the tool magazine 210, the tool magazine drive mechanism 220 may be made up of, for example, a rack and pinion, a timing belt, a gear, and/or other associated elements.

Figure 5:
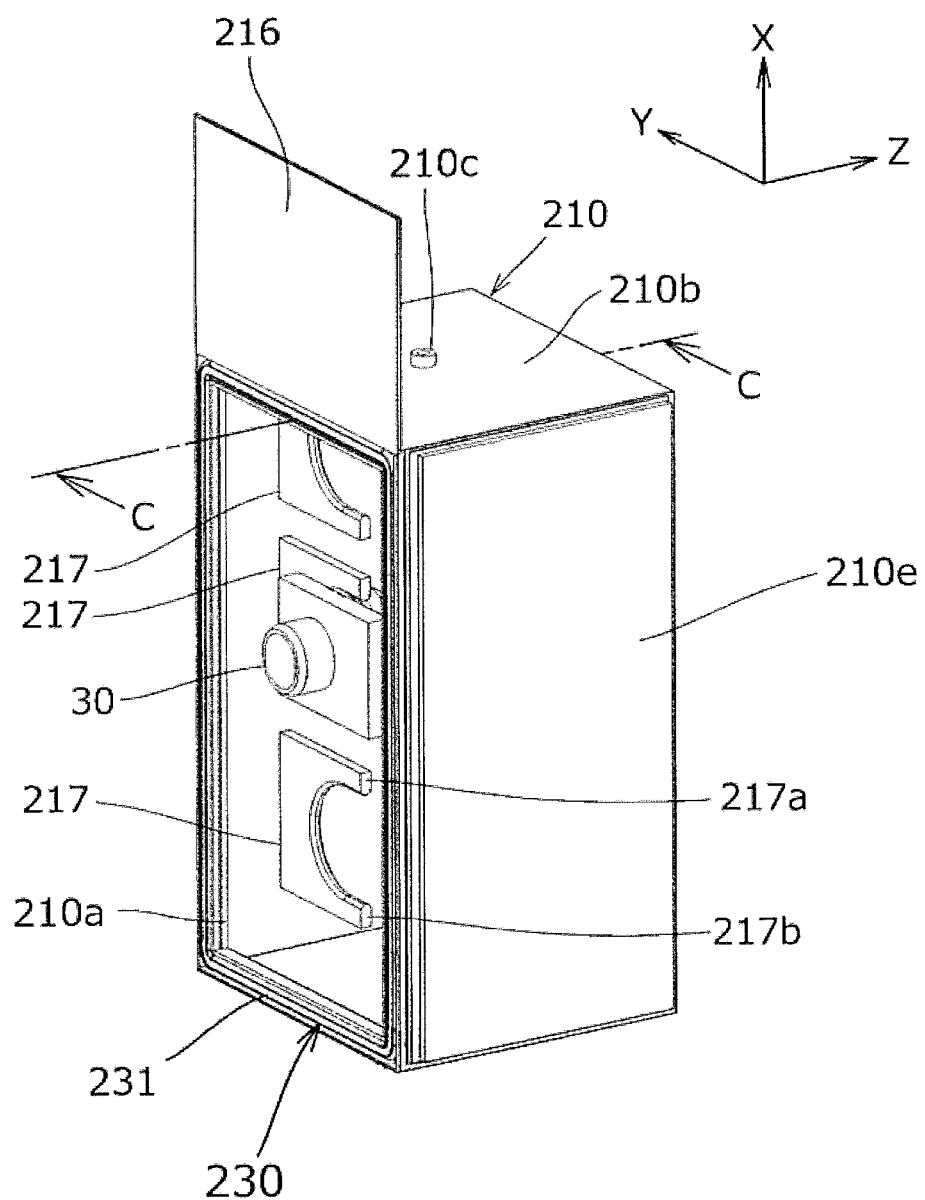
Figure 6:
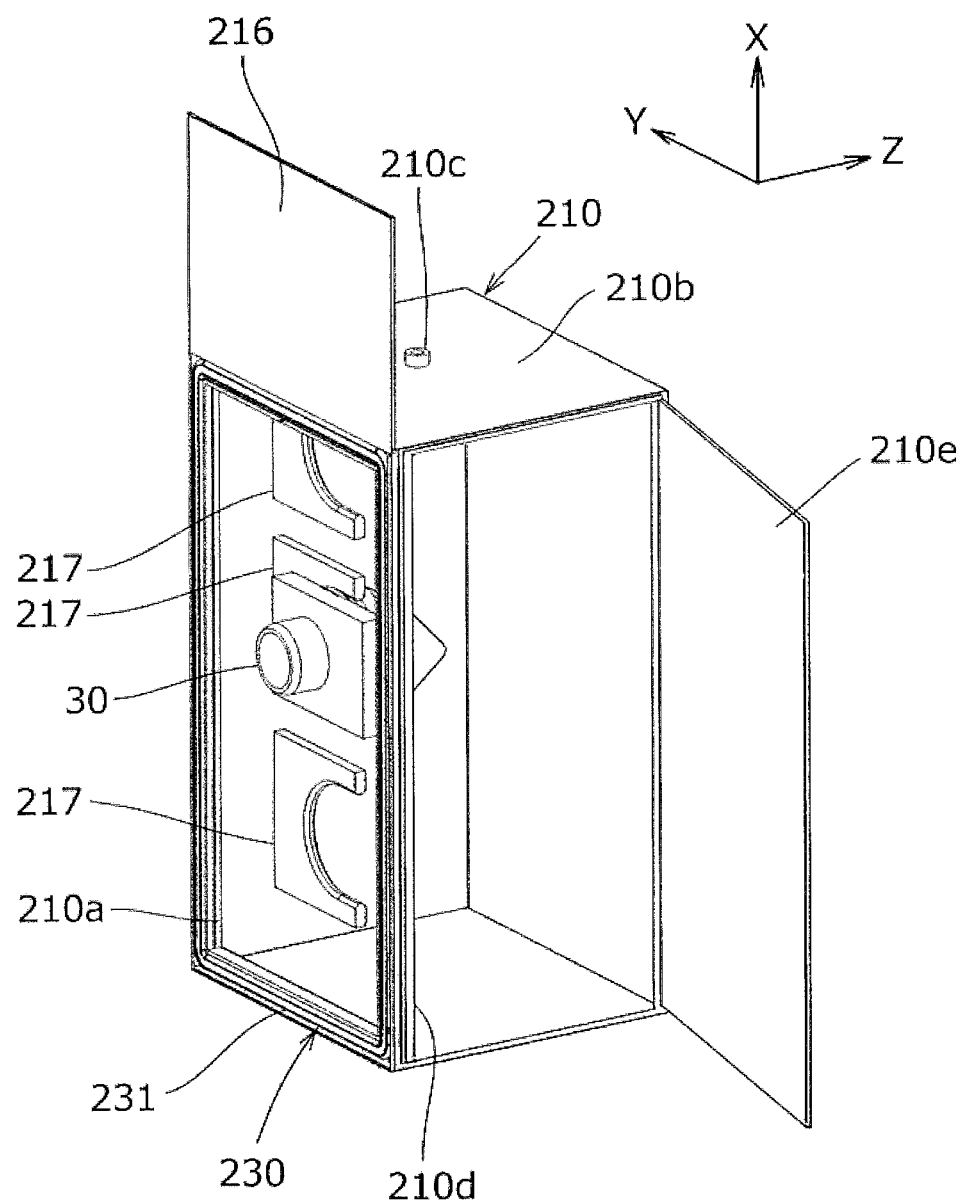

FIG. 5 is a perspective view of the tool magazine 210 as seen from the side of the magazine opening 210a with a magazine door 210e closed. FIG. 6 is a perspective view of the tool magazine 210 as seen from the side of the magazine opening 210a with the magazine door 210e open. In both FIGS. 5 and 6, the torch 30 is stored in the tool magazine 210. As illustrated in FIGS. 5 and 6, the tool magazine 210 has an approximately rectangular parallelepiped box shape, and is open on the surface of the tool magazine 210 facing the in-machining region IR (the left surface in FIGS. 5 and 6), forming the magazine opening 210a. The tool magazine 210 illustrated in FIG. 6 is also open on the front surface of the tool magazine 210 (which is a surface different from the surface on which the magazine opening 210a is disposed), forming a take-out opening 210d (FIG. 6) on the front surface. The take-out opening 210d is closable and openable by the magazine door (first door) 210e, which is movable on a hinge of the tool magazine 210. It is to be noted that insofar as the tool magazine 210 has a box shape, the tool magazine 210 may not necessarily have an approximately rectangular parallelepiped shape but may have any other polyhedral shape or a partially curved shape.

It is to be noted that when the tool magazine 210 is at the storage position, the magazine door 210e overlaps the outer door 22e, as illustrated in FIG. 3. Therefore, when the tool magazine 210 is at the storage position, the worker is able to make access to the magazine door 210e by opening the outer door 22e, and is able to take out the torch 30 out of the tool magazine 210 by opening the magazine door 210e.

As illustrated in FIGS. 5 and 6, a supply port 210c is formed approximately at the center of the top surface, 210b, of the tool magazine 210. The supply port 210c connects the inside and outside of the tool magazine 210. As illustrated in FIG. 2, the supply port 210c is connected to an air supplier CAS through a hose HS, which is indicated schematically by a dotted line. Clean air is supplied into the tool magazine 210 from the air supplier CAS through the hose HS and the supply port 210c. This keeps the inside of the tool magazine 210 a clean environment. It is to be noted that the supply port 210c may be formed at a position other than approximately the center of the top surface 210b; that is, the supply port 210c may be formed on another surface of the tool magazine 210. It is also to be noted that the air supplier CAS is illustrated in FIG. 2 for descriptive purposes only and may not necessarily be positioned as illustrated. It is also to be noted that the hose HS is flexible enough to adapt to the movement of the tool magazine 210.

Also as illustrated in FIGS. 5 and 6, a rectangular shield plate 216 is mounted on an upper end portion of the magazine opening 210a. The shield plate 216 extends in the X axis direction from the upper end portion of the magazine opening 210a and is movable together with the tool magazine 210.

Three holders 217, each of which is for holding a torch 30 to be stored, are disposed on a side surface of the tool magazine 210. The holders 217 are aligned in the movement direction of the tool magazine 210; that is, in this embodiment, the holders 217 are aligned in the X axis direction, which is equivalent to the height direction of the hybrid working machine 10. Each holder 217 includes a pair of grippers (tool holding members) 217a and 217b. The grippers 217a and 217b are aligned in the vertical direction, and are movable toward and away from each other such that the grippers 217a and 217b are biased toward each other by, for example, a spring mechanism, not illustrated. In the example illustrated in FIGS. 5 and 6, the center holder 217 is holding the torch 30. The tool magazine 210 includes no other movable part than the holder 217 in the tool magazine 210. This eliminates or minimizes occurrence of foreign matter in the tool magazine 210. It is to be noted that there is no limitation to the number of holders 217. It is also to be noted that the tool holding member will not be limited to a gripper to hold the tool; another possible example is that the tool holding member holds the torch 30 by utilizing air pressure or magnetic force.

Figure 7:
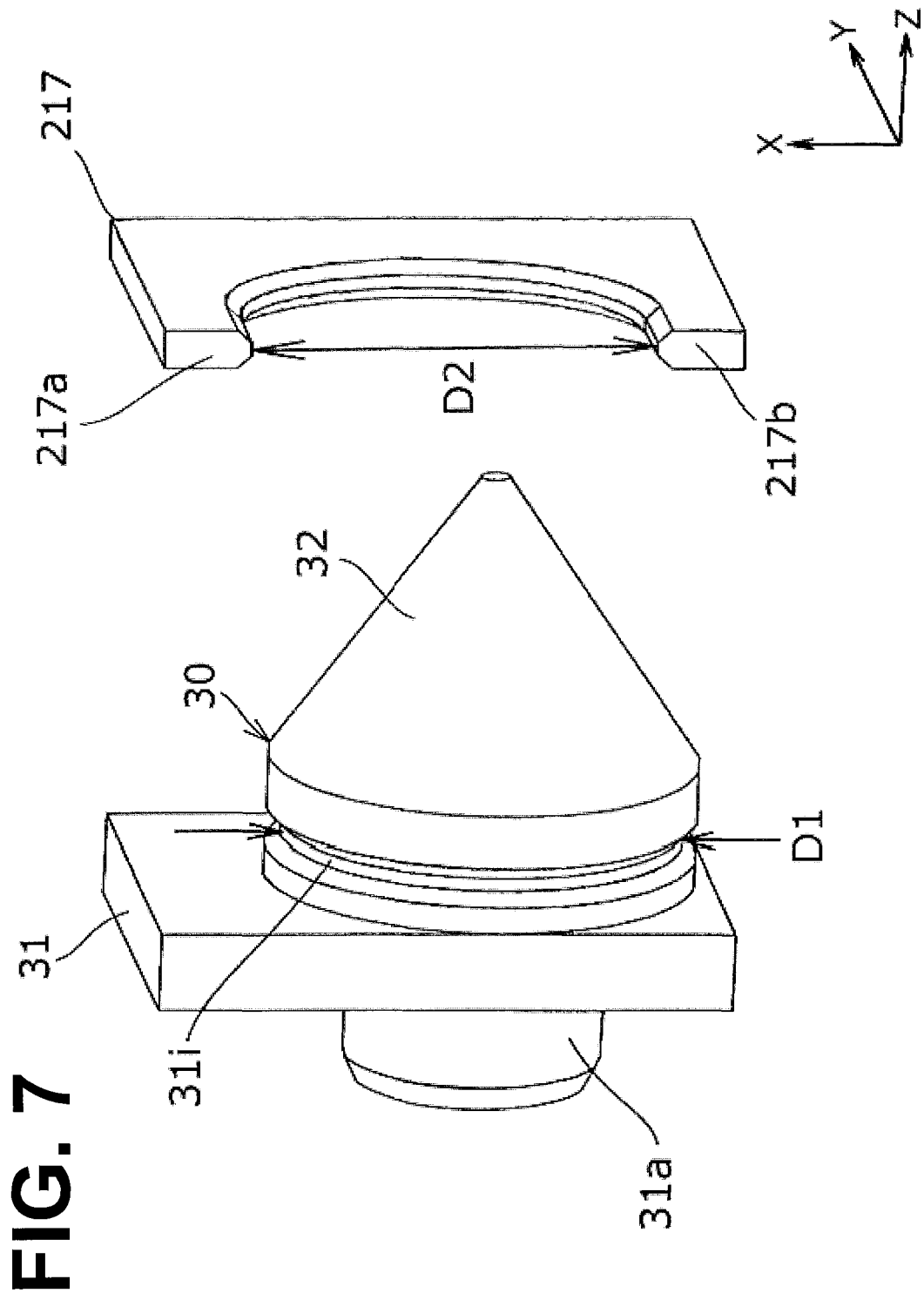
FIG. 7 illustrates a relationship between a holder 217 and a torch 30.

FIG. 7 illustrates a relationship between the holder 217 and the torch 30. Details of the torch 30 will be described later. As illustrated in FIG. 7, a held portion 31*i* of the torch 30 has an outer diameter of D1. The grippers 217*a* and 217*b* of the holder 217 each have an arcuate inner circumference and a minimal inscribed circle diameter of D2 in a free state such that D1>D2.

The tool storage 200 includes a sealing device 230, which includes an expandable seal 231. As illustrated in FIGS. 5 and 6, the expandable seal 231 of the sealing device 230 is disposed throughout the circumference of the magazine opening 210*a* of the tool magazine 210.

Figure 8:
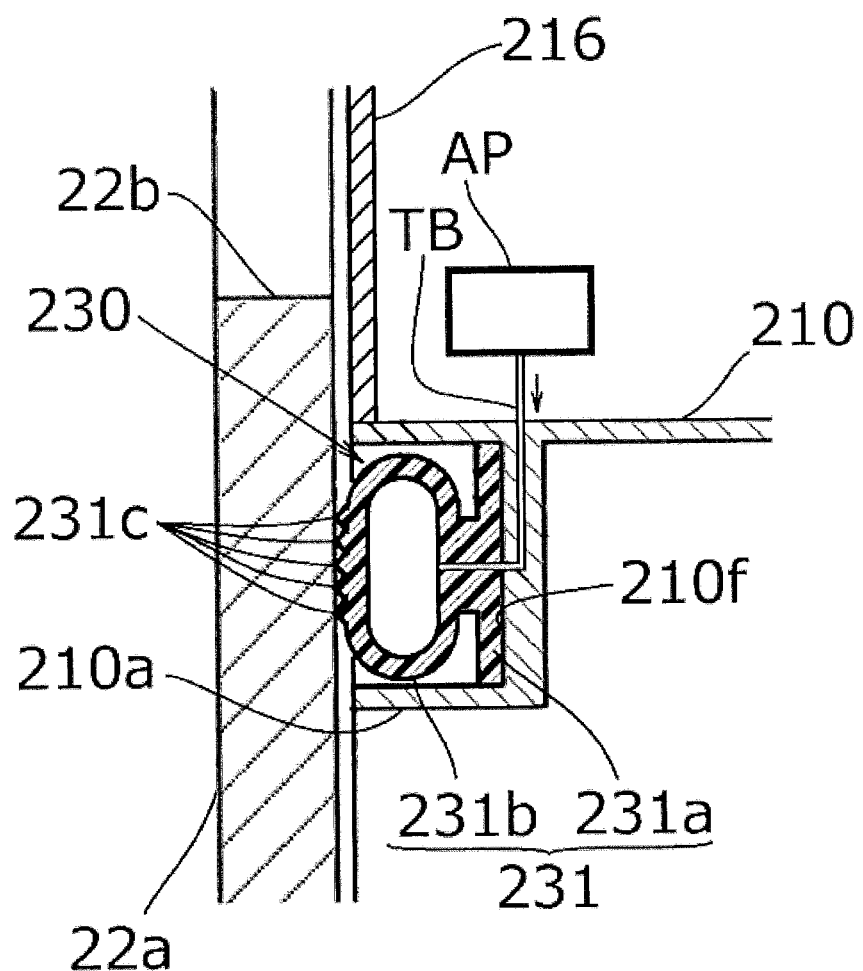
FIG. 8 is an enlarged cross-sectional view of the tool magazine 210 together with an adjacent wall 22a along the C-C line illustrated in FIG. 5.
Figure 9:
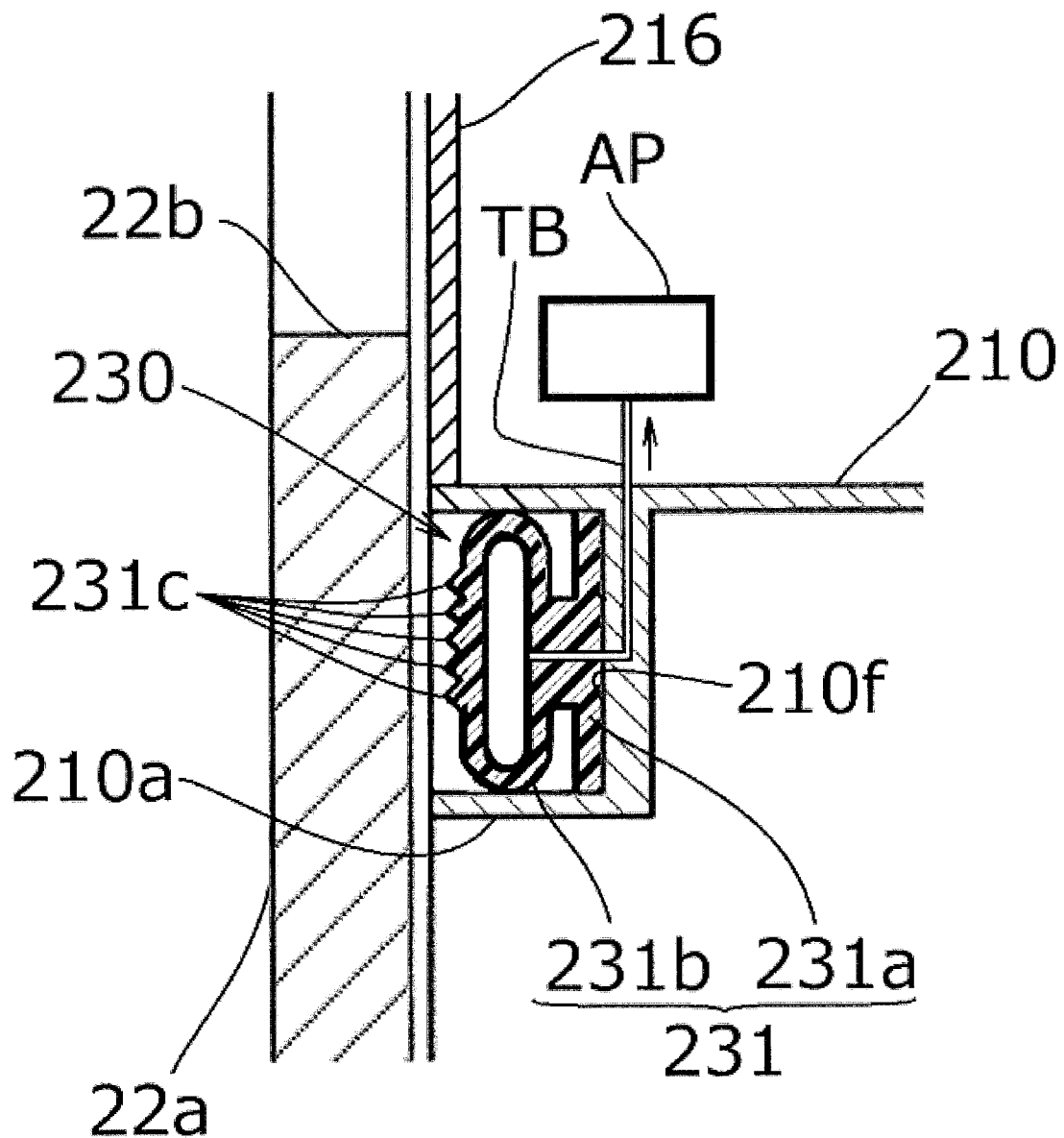
FIG. 9 is an enlarged cross-sectional view of the tool magazine 210 together with the adjacent wall 22a along the C-C line illustrated in FIG. 5.

FIG. 8 is an enlarged cross-sectional view of the tool magazine 210 together with the adjacent wall 22*a* along the C-C line illustrated in FIG. 5 with the expandable seal 231 in expansion state. FIG. 9 is an enlarged cross-sectional view of the tool magazine 210 together with the adjacent wall 22*a* along the C-C line illustrated in FIG. 5 with the expandable seal 231 in contraction state. As illustrated in FIG. 8, a groove 210*f* is formed on the circumference of the magazine opening 210*a*. The expandable seal 231, which is made of rubber or resin, includes: a base 231*a*, which is disposed in the groove 210*f*; and a hollow seal 231*b*, which is connected to the base 231*a* and extends throughout the space between the groove 210*f* and the wall 22*a*. The seal 231*b* is made of an extensible and contractible material and has a tubular shape. By introducing a fluid (in this embodiment, gas) into the seal 231*b*, the seal 231*b* is pressurized and caused to expand. It is to be noted that while the expandable seal 231 is disposed in the groove 210*f*, the groove 210*f* may not necessarily be provided; instead, the expandable seal 231 may be mounted on the circumference of the magazine opening 210*a* using a fixing element or a similar element. The seal 231*b* has a plurality of protrusions (projections) 231*c* throughout the seal 231*b*. The protrusions 231*c* come into contact with the wall 22*a* when the seal 231*b* expands. The seal 231*b*, however, may not necessarily be provided with the protrusions 231*c*.

As illustrated in FIG. 8, the sealing device 230 includes an air pump AP and a pipe TB. The pipe TB penetrates the base 231*a* and extends to the outside of the tool magazine 210, and the expandable seal 231 is connected to the air pump AP through the pipe TB. The air pump AP is connected to the controller PROC (FIG. 2) via a wiring, not illustrated, and is controlled by the controller PROC to pressurize or de-pressurize the expandable seal 231.

The air pump AP is controlled by the controller PROC to perform a pressurizing operation of sending air through the pipe TB under pressure into the seal 231*b*, causing the seal 231*b* to be filled with the air and expand as illustrated in FIG. 8. The expanding seal 231*b* comes into contact with the circumference of the magazine opening 210*a* and the wall 22*a*, which is a part of the storage device cover 22 facing the tool magazine 210. Thus, the expandable seal 231 of the sealing device 230 seals the gap between the circumference of the magazine opening 210*a* and the wall 22*a*, making the magazine opening 210*a* shielded against the external environment. This state will be referred to as second state.

The air pump AP is also controlled by the controller PROC to perform a de-pressurizing operation, making the pressure in the pipe TB negative pressure and causing the air inside the seal 231*b* to be sucked as illustrated in FIG. 9. This causes the expandable seal 231 of the sealing device 230 to move apart from the wall 22*a*, which is a part of the storage device cover 22 facing the tool magazine 210. This state will be referred to as first state. It is to be noted that the base 231*a* may be disposed on the side of the wall 22*a*, so that the contracting expandable seal 231 moves apart from the circumference of the magazine opening 210*a*.

It is also to be noted that the air pump AP may double as the air supplier CAS. It is also to be noted that the fluid supplied to the seal 231*b* may be any other gas than air or may be a liquid.

Figure 10:
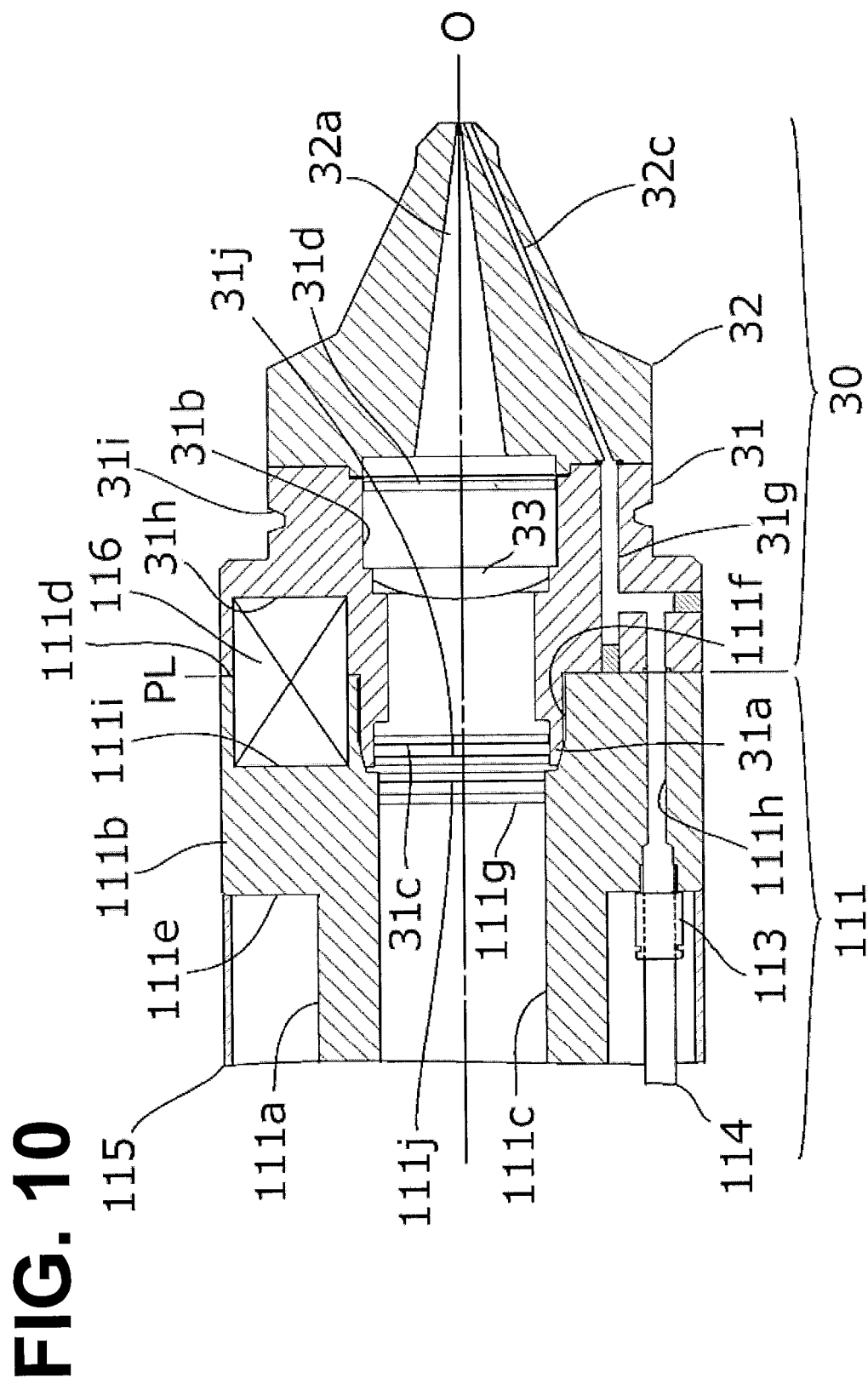
FIG. 10 is a cross-sectional view of a machining head 111 and the torch 30 mounted on a leading end portion of the machining head 111.

FIG. 10 is a cross-sectional view of the machining head 111 and the torch 30 mounted on the leading end portion of the machining head 111, with a line PL indicating a separation position at which the machining head 111 are the torch 30 separated from each other. As illustrated in FIG. 10, the machining head 111 includes: a manifold 111*a*, which has a cylindrical shape; and a receiving portion 111*b*, which is disposed at a leading end portion of the manifold 111*a*.

A machining head optical path 111*c* extends along an axis O between the manifold 111*a* and the receiving portion 111*b*. The receiving portion 111*b* has: an end surface 111*d*, which is disposed on the side of the torch 30; and a ring-shaped end surface 111*e*, which is opposite to the end surface 111*d*. The machining head optical path 111*c* has an enlarged diameter in the receiving portion 111*b*. This enlarged diameter portion defines an engagement hole 111*f*.

In the machining head optical path 111*c*, a light-transmitting machining head protection window 111*g* is disposed near the engagement hole 111*f*. The machining head protection window 111*g* protects the machining head optical path 111*c* from foreign matter, preventing foreign matter from contaminating the laser light source (not illustrated) disposed deep inside the machining head optical path 111*c*.

Also in the machining head optical path 111*c*, a machining head protection shutter 111*j*, which is openable and closable, is disposed between the machining head protection window 111*g* and the torch 30-side end surface 111*d*. When the torch 30 is mounted on the machining head 111, the machining head protection shutter 111*j* is opened to allow a laser beam to pass through the machining head optical path 111*c*. When the machining head 111 is separated from the torch 30, the machining head protection shutter 111*j* is closed to protect the machining head optical path 111*c*.

A machining head-side powder supply path 111*h* extends in parallel to the machining head optical path 111*c* and penetrates the receiving portion 111*b*. The machining head-side powder supply path 111*h* is connected to a powder hose 114 at an end portion of the ring-shaped end surface 111*e* through a connector 113. The powder hose 114 passes through the space between the manifold 111*a* and a cylindrical shield member 115, which surrounds the manifold 111*a*, and the powder hose 114 is connected to a powder supply source, not illustrated.

On the end surface 111*d* of the receiving portion 111*b*, three depressions 111*i* are formed (only one of which is illustrated). In each of the depressions 111*i*, a chuck mechanism 116 is disposed. The chuck mechanism 116 is caused to operate by, for example, pressure air. Specifically, the chuck mechanism 116 is capable of holding the torch 30 by fitting with a chuck hole 31*h* (described later) of the torch 30, and is capable of releasing the torch 30 by releasing the chuck hole 31*h*. The chuck mechanism 116 is well known in the art and will not be elaborated upon here.

The torch 30 includes a base 31 and an approximately conical nozzle 32, which is connected to the base 31. The base 31 includes a cylindrical portion 31*a*, which is engageable with the engagement hole 111f of the receiving portion 111b. The base 31 and the nozzle 32 are separatable from each other.

A first tool optical path 31b extends in the base 31 along the axis O and penetrates the base 31, and a second tool optical path 32a extends in the nozzle 32 along the axis O and penetrates the nozzle 32. The second tool optical path 32a has a tapering shape whose diameter becomes smaller in the direction away from the base 31. The second tool optical path 32a is open at a leading end portion of the nozzle 32. The first tool optical path 31b and the second tool optical path 32a define a laser emission path through which a laser beam is emitted.

In the first tool optical path 31b, the following elements are arranged, in the order from a position near a leading end portion of the cylindrical portion 31a: a light-transmitting first tool protection window 31c; a light concentration lens (optical element) 33; and a second tool protection window 31d, which shields an end portion of the laser emission path.

The first tool protection window 31c and the second tool protection window 31d prevent foreign matter from entering the first tool optical path 31b and contaminating the light concentration lens 33.

Also in the first tool optical path 31b, a tool protection shutter 31j, which is openable and closable, is disposed between the first tool protection window 31c and the leading end portion of the cylindrical portion 31a. When the torch 30 is mounted on the machining head 111, the tool protection shutter 31j is opened to allow the laser beam past the machining head optical path 111c to enter the first tool optical path 31b of the torch 30. When the torch 30 is separated from the machining head 111, the tool protection shutter 31j is closed to protect the first tool optical path 31b.

A first tool-side powder supply path 31g extends along the first tool optical path 31b and penetrates the base 31. With the torch 30 mounted on the leading end portion of the machining head 111, the first tool-side powder supply path 31g is connected to the machining head-side powder supply path 111h.

A second tool-side powder supply path 32c extends toward the leading end portion of the nozzle 32 and penetrates the nozzle 32. The second tool-side powder supply path 32c is connected to the first tool-side powder supply path 31g. The first tool-side powder supply path 31g and the second tool-side powder supply path 32c define a powder supply path.

The chuck hole 31h is disposed on the machining head-side end surface of the base 31 at a position corresponding to the depression 111i of the receiving portion 111b. The held portion 31i is disposed near a nozzle side position of the base 31 such that the held portion 31i is depressed from the surrounding outer circumferential surface of the base 31.

At the time of additive manufacturing, a laser beam emitted from the laser light source, not illustrated, disposed in the machining head 111 passes through the machining head optical path 111c in the manifold 111a and enters the first tool optical path 31b of the torch 30. Specifically, the laser beam is concentrated by the light concentration lens 33, passes through the second tool optical path 32a, and is emitted from the leading end portion of the nozzle 32 toward a surface of the workpiece W.

Also, metal powder (additive material) together with pressure gas is supplied from the powder supply source, not illustrated, to the machining head-side powder supply path 111h of the receiving portion 111b through the powder hose 114. Then, the powder is guided through the first tool-side powder supply path 31g and the second tool-side powder supply path 32c of the torch 30, and finally gushes from the leading end portion of the nozzle 32 toward the surface (irradiated region) of the workpiece W to which the laser beam is being emitted (see FIGS. 1 and 2). This ensures that the gush of powder is fused and attached to the workpiece W by the laser beam, and that the workpiece W after being subjected to additive manufacturing can be cut into any desired shape using the tool spindle 130 (FIGS. 1 and 2).

Motions of Tool Storage

Figure 11:
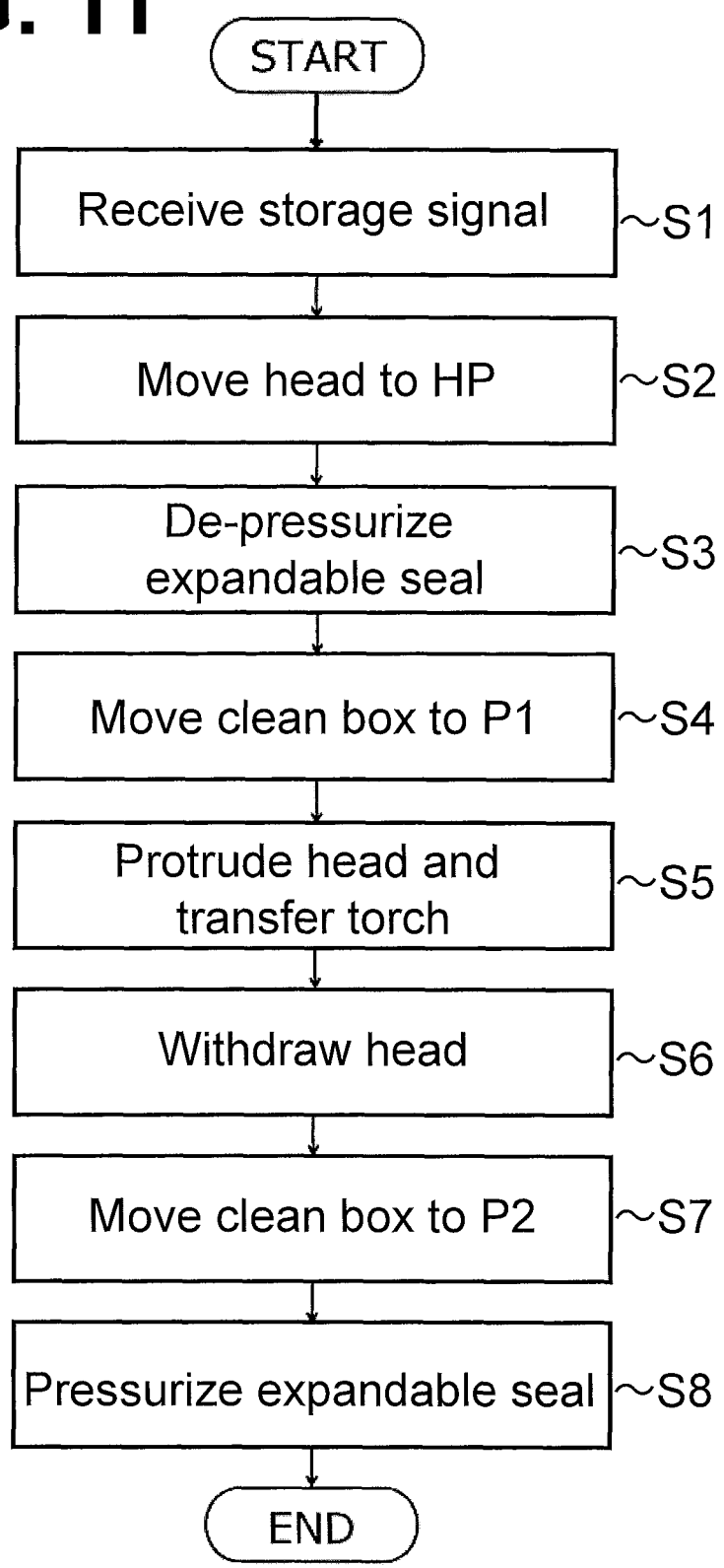
FIG. 11 is a flowchart of tool storage control performed by a controller PROC.

Motions of the tool storage 200 will be described below by referring to the accompanying drawings. FIG. 11 is a flowchart of tool storage control performed by the controller PROC. FIGS. 12 to 19 illustrate motions related to the machining head 111 and the tool storage 200.

During the additive manufacturing in the in-machining region IR, the tool magazine 210 is positioned at a lowermost position P2 (storage position) in the X axis direction by the tool magazine drive mechanism 220, as illustrated in FIGS. 1 to 4B. At the lowermost position P2, the access opening 22b of the wall 22a does not overlap the magazine opening 210a. Also at the lowermost position P2, the access opening 22b is covered by the shield plate 216 of the tool magazine 210. This prevents foreign matter in the in-machining region IR from entering the storage region SR. When the tool magazine 210 moves from the lowermost position P2, the shield plate 216 withdraws from the access opening 22b. This ensures that the access opening 22b is opened and closed automatically, without a dedicated opening and closing mechanism.

Also at the lowermost position P2, the sealing device 230 closes the magazine opening 210a, and clean air is supplied into the tool magazine 210 from the clean air source CAS. This prevents foreign matter from entering the tool magazine 210, and prevents the torch 30 stored in the tool magazine 210 from being contaminated.

After the additive manufacturing step has ended, the torch 30 is removed from the machining head 111 and stored in the tool magazine 210. Specifically, the controller PROC (FIG. 2) receives a storage command (step S1 in FIG. 11), and performs the following control in response to the storage command.

Figure 12:
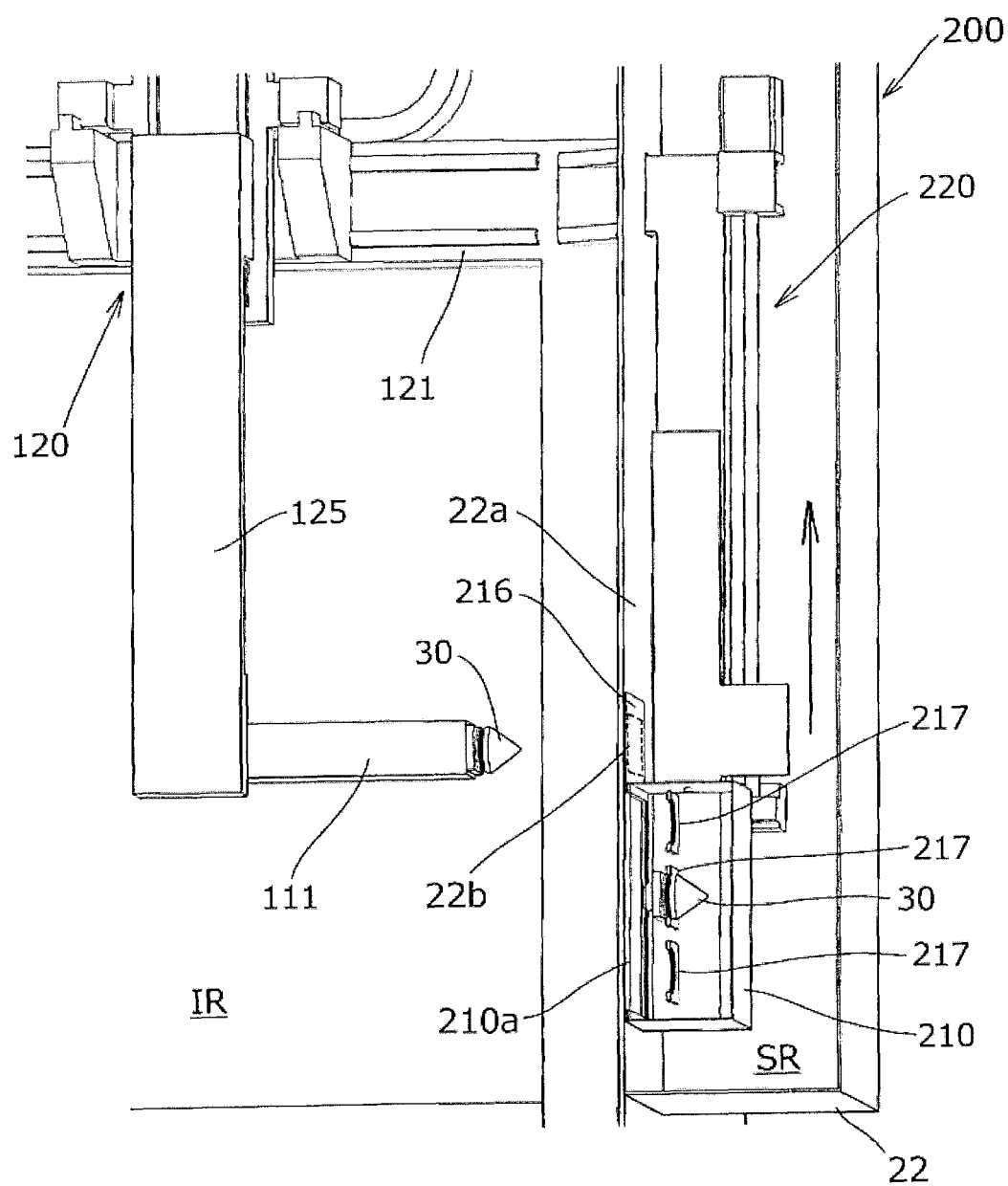
FIG. 12 illustrates a motion related to the machining head 111 and the tool storage 200.

First, when the machining head 111 with the torch 30 mounted is disposed at a position other than a home position HP, the controller PROC moves the machining head 111 to the home position HP at step S2. As used herein, the term "home position HP" refers to a position at which an end portion of the machining head 111 faces the access opening 22b as illustrated in FIG. 12 (and FIGS. 1 and 2).

At step S3, the controller PROC causes the air pump AP to perform a de-pressurizing operation to move the sealing device 230 apart from the wall 22a (see FIG. 9). This prevents the expandable seal 231 from being worn when the tool magazine 210 is moved, ensuring a smooth movement of the tool magazine 210 with no or minimal resistance from the contact with the expandable seal 231.

At step S4, the controller PROC drives the servo motor 226 into rotation in its positive rotation direction, causing the screw shaft 225 to make a rotational motion. This rotational motion is converted into a linear motion of the ball nut 224, which then causes the tool magazine 210 to move upward in the X axis direction and the magazine opening 210a to face (overlap) the access opening 22b. This makes it possible to make access to the tool magazine 210 from the in-machining region IR through the access opening 22b.

Figure 13:
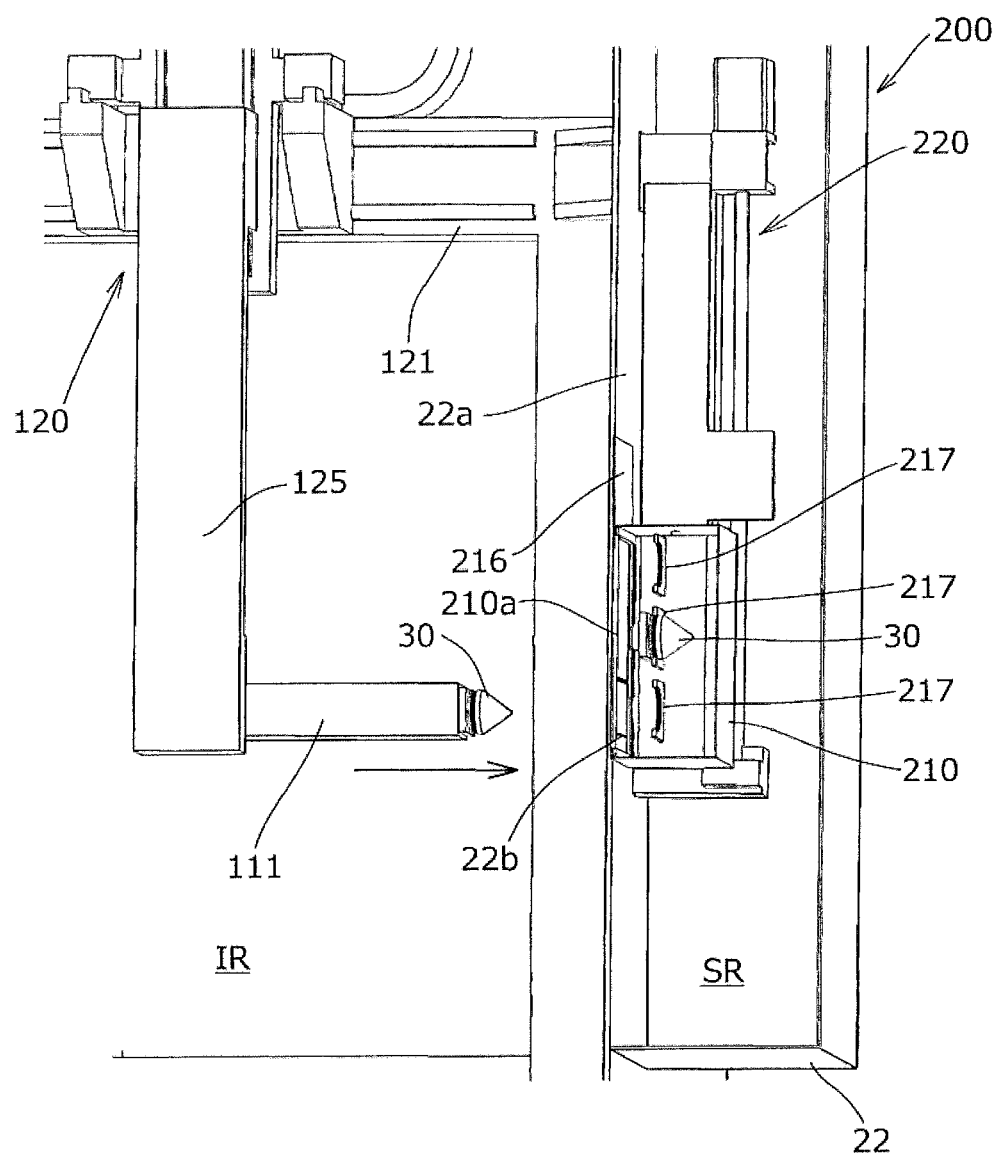
FIG. 13 illustrates a motion related to the machining head 111 and the tool storage 200.

It is to be noted that the control signal from the controller PROC includes the number of rotations of the servo motor 226. It is also to be noted that in this example, a torch is stored in the lowermost holder 217 of the tool magazine 210. In this case, the tool magazine drive mechanism 220 is controlled by the controller PROC to move the tool magazine 210 at a storage position P2 upward to a position (exchange position P1) at which the lowermost holder 217 faces the access opening 22b, as illustrated in FIG. 13. That is, the term "exchange position" refers to a position corresponding to any one of a plurality of holders 217 of the tool magazine 210 at which the torch 30 can be transferred between the holder 217 and the machining head 111. The controller PROC, therefore, controls the tool magazine drive mechanism 220 to move the tool magazine 210 to an exchange position corresponding to the position of each of the holders 217.

Figure 14:
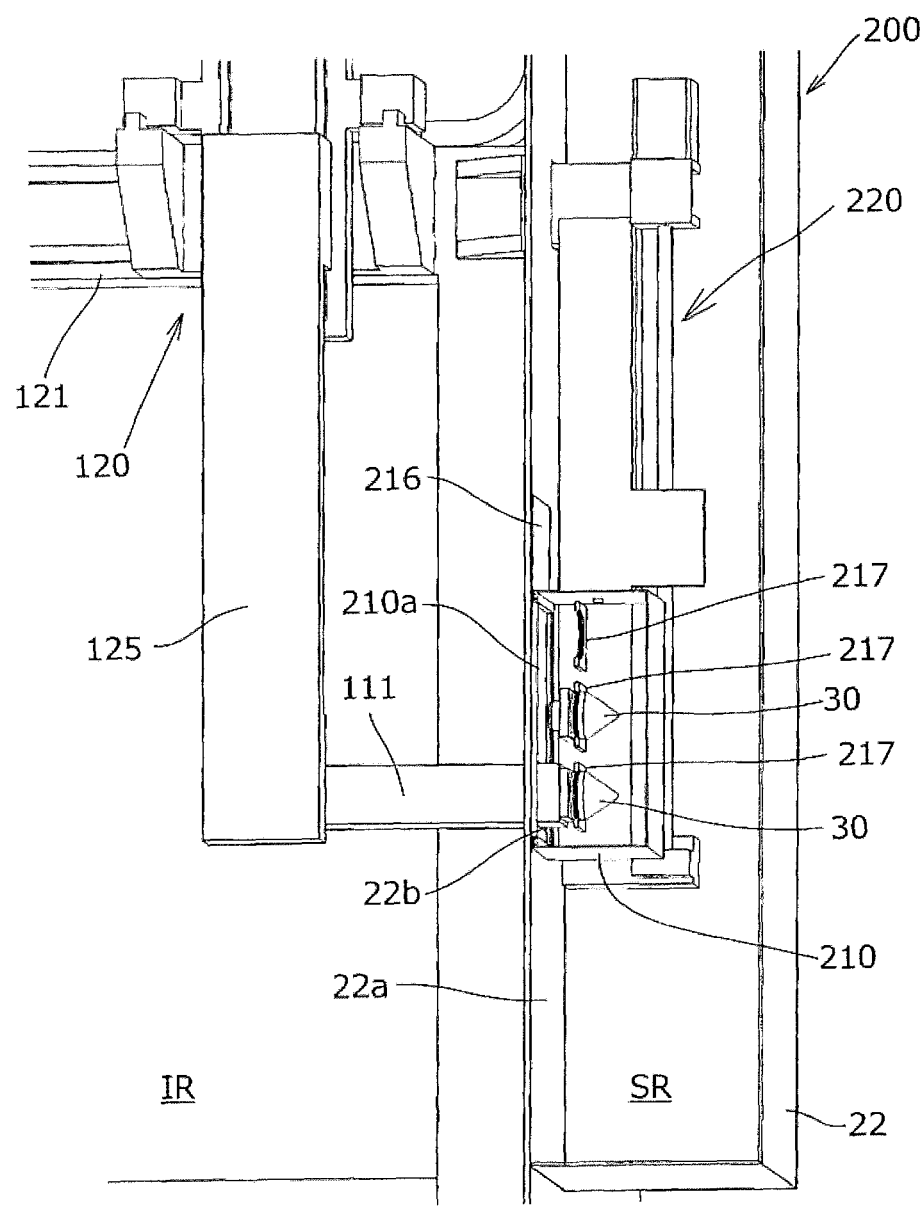
FIG. 14 illustrates a motion related to the machining head 111 and the tool storage 200.
Figure 15:
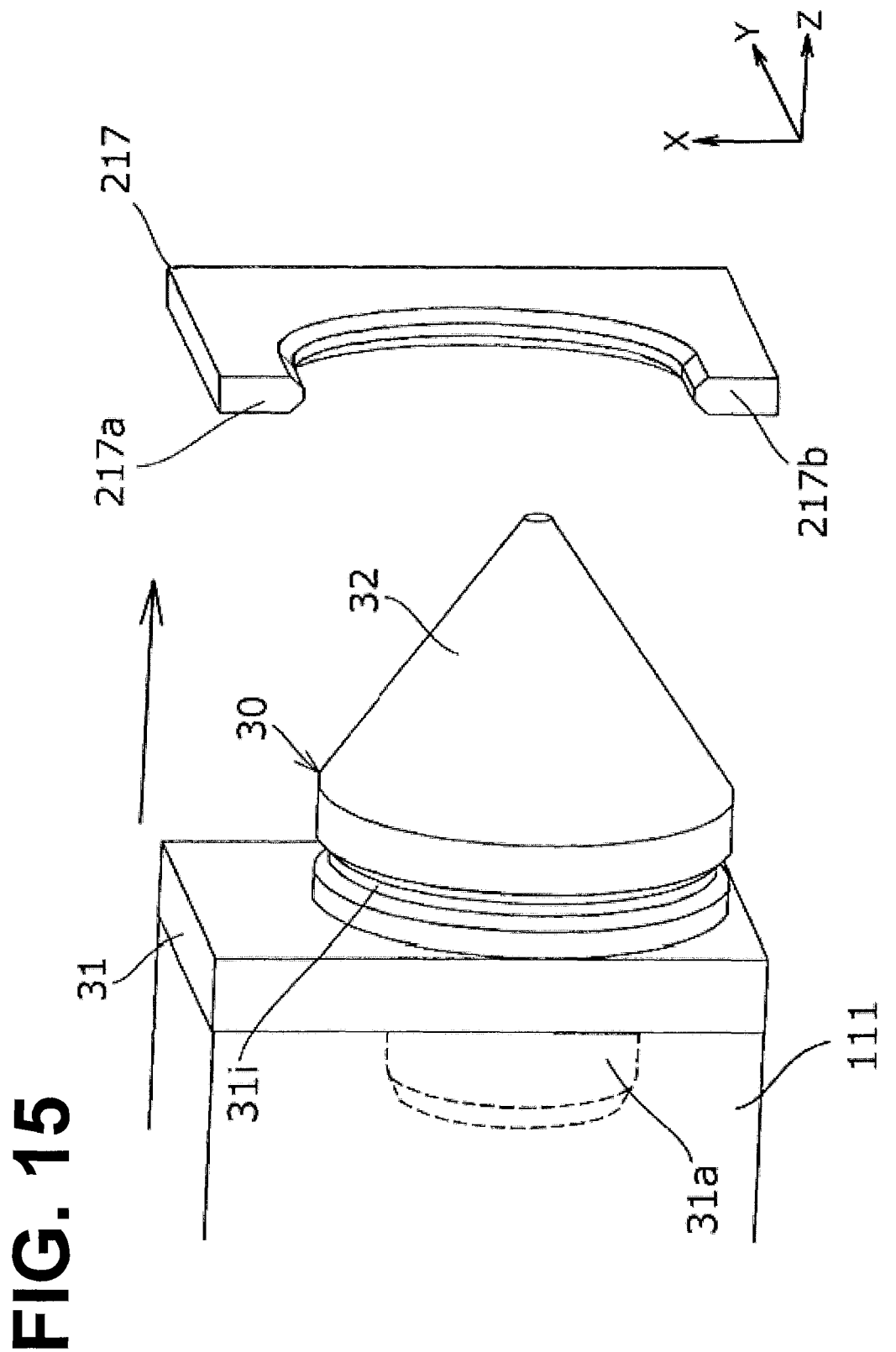
FIG. 15 is an enlarged perspective view of the leading end portion of the machining head 111 together with the holder 217, illustrating transfer of the torch 30.

At step S5, the controller PROC controls the machining head 111 via the first movement mechanism 120 to: move (protrude) in the Z axis direction; pass through the access opening 22b and the magazine opening 210a; and enter the tool magazine 210 (see FIG. 14).

A detailed description will be made with regard to motions of transferring the torch 30 to the holder 217 as controlled by the controller PROC. When the torch 30 is held by the holder 217, the machining head 111 is caused to approach the holder 217 in the Z axis direction in the manner illustrated in FIG. 15, which illustrates an enlarged view of the leading end portion of the machining head 111. Specifically, while the machining head 111 is approaching the holder 217, the axis of the torch 30 is shifted away from the center of the space defined between the grippers 217a and 217b.

Figure 16:
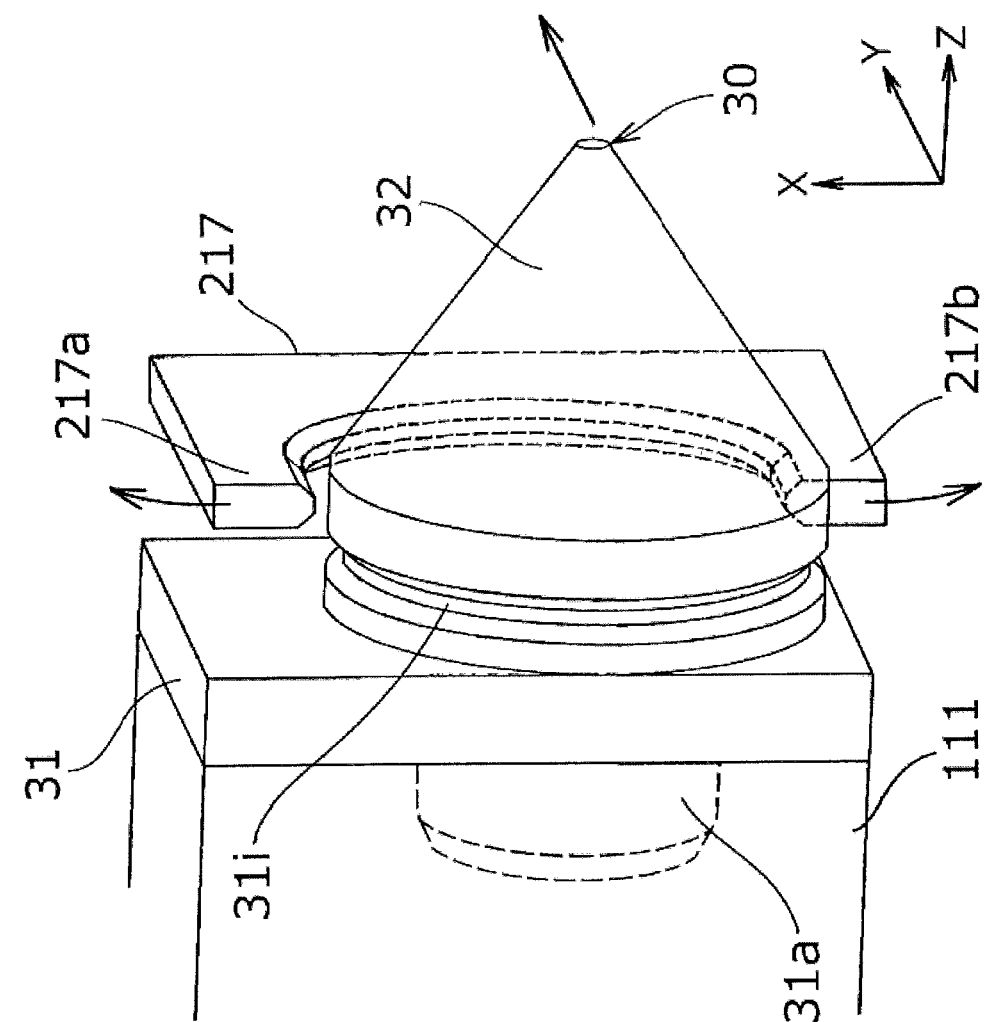
FIG. 16 is an enlarged perspective view of the leading end portion of the machining head 111 together with the holder 217, illustrating transfer of the torch 30.

Then, as illustrated in FIG. 16, when the held portion 31i of the torch 30 has reached a position beside the grippers 217a and 217b, the machining head 111 is stopped. Then, the machining head 111 is caused to approach the holder 217 in the Y axis direction. This causes the held portion 31i to contact the grippers 217a and 217b at their leading end portions. Then, the machining head 111 and the torch 30 are further moved in the Y axis direction. This causes the grippers 217a and 217b to move away from each other, bringing the inner circumferences of the grippers 217a and 217b into close contact with the outer circumference of the held portion 31i.

When the axis of the torch 30 matches the center of the space defined between the grippers 217a and 217b, the machining head 111 is stopped. With the machining head 111 in this state, a spring mechanism, not illustrated, keeps the grippers 217a and 217b biased against the held portion 31i, preventing removal of the torch 30 from the holder 217.

Figure 17:
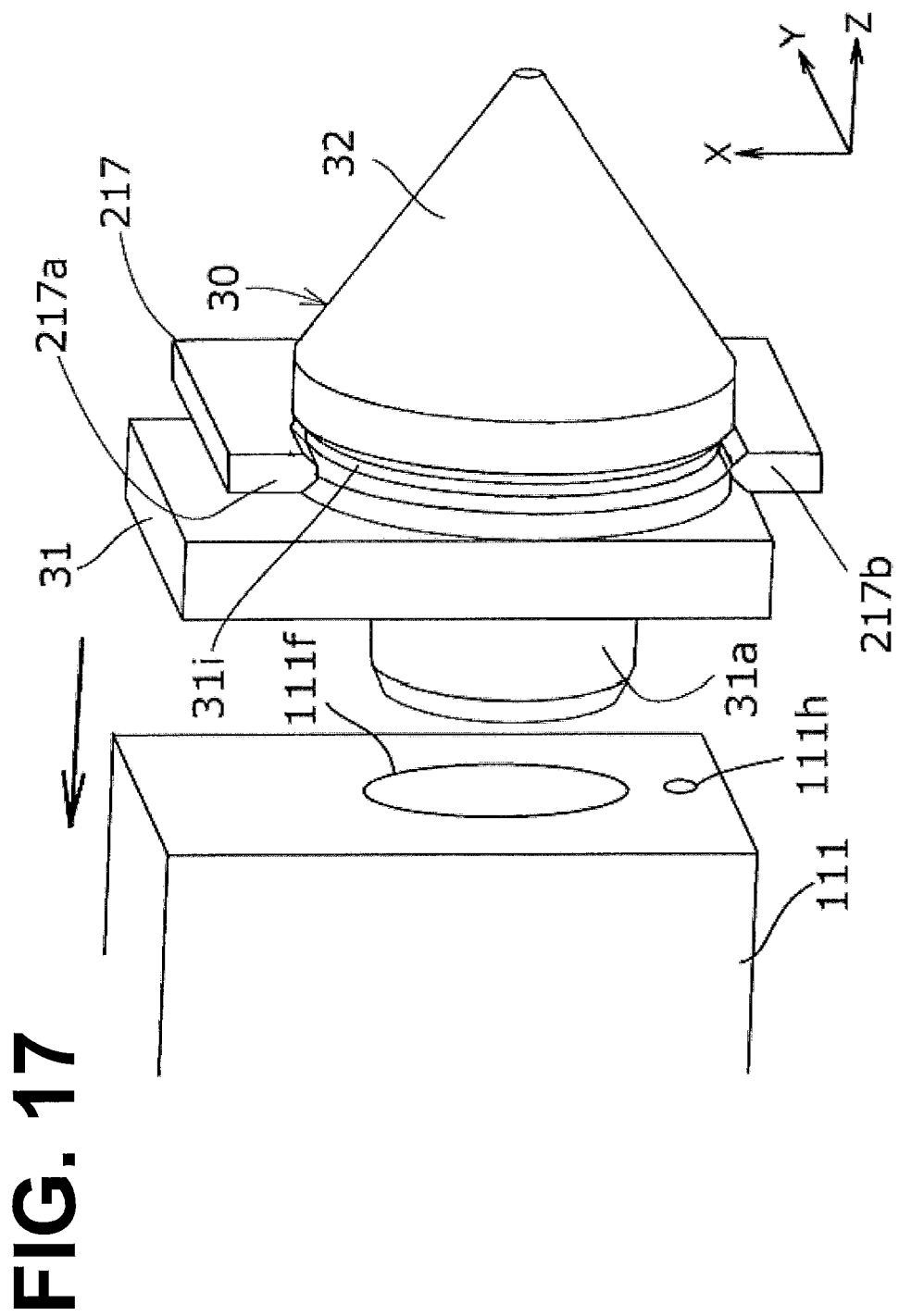
FIG. 17 is an enlarged perspective view of the leading end portion of the machining head 111 together with the holder 217, illustrating transfer of the torch 30 with a chuck mechanism of the machining head 111 omitted.

Then, the controller PROC makes a release command to the chuck mechanism 116 (FIG. 10) of the machining head 111, making the machining head 111 and the torch 30 into a separatable state. In the separatable state, the machining head 111 is moved away from the torch 30 as illustrated in FIG. 17, separating the machining head 111 from the torch 30 held by the holder 217. Immediately before the motion of separating the torch 30 and the machining head 111 from each other, the machining head protection shutter 111j and the tool protection shutter 31j, which are in open state, are caused to make a closing motion. It is to be noted that when the torch 30 is removed from the holder 217, the foregoing motions may be performed in reverse order.

Figure 18:
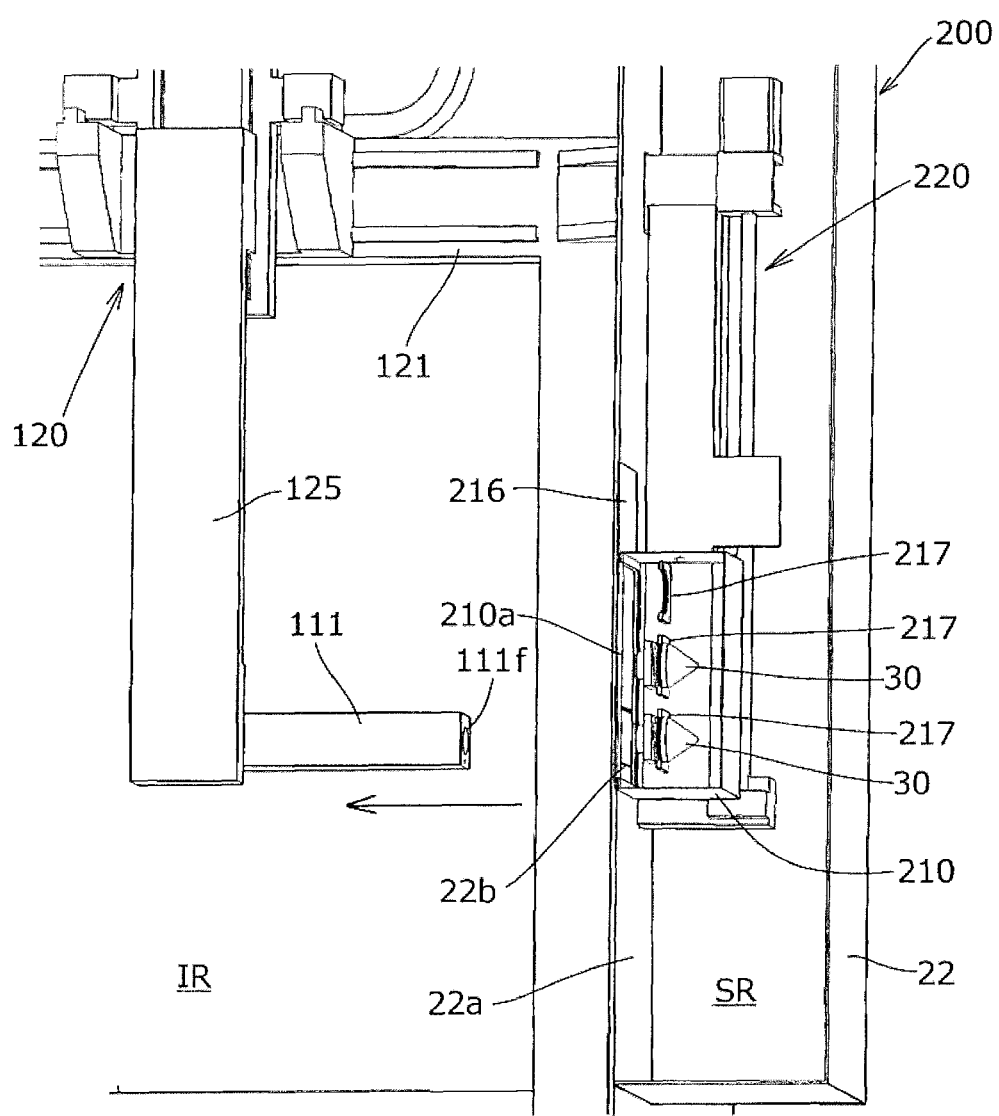
FIG. 18 illustrates a motion related to the machining head 111 and the tool storage 200.

At step S6, which is illustrated in FIG. 11, the controller PROC controls the machining head 111 via the first movement mechanism 120 to move (withdraw) in the negative Z axis direction, as illustrated in FIG. 18. With the torch 30 left in the tool magazine 210, the machining head 111 is caused to pass through the magazine opening 210a and the access opening 22b and return to the in-machining region IR.

Figure 19:
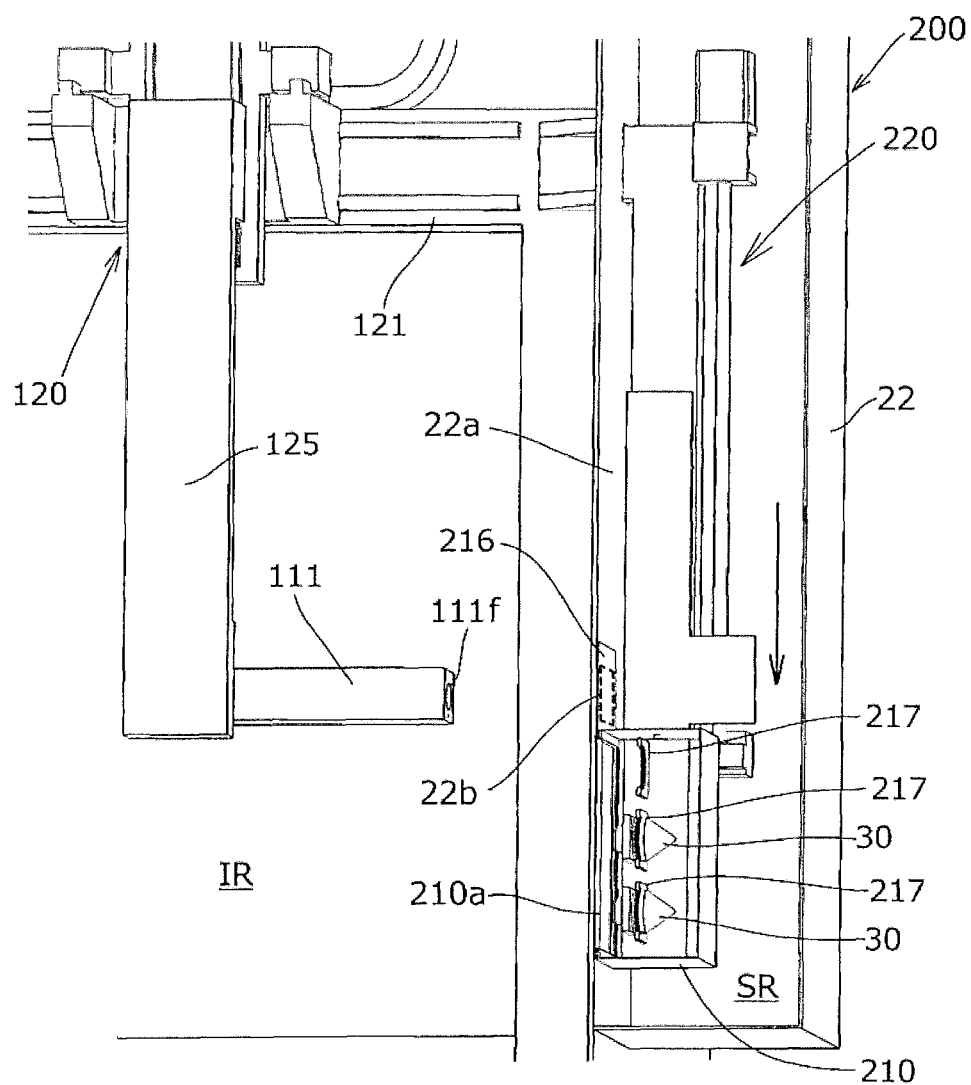
FIG. 19 illustrates a motion related to the machining head 111 and the tool storage 200.

At step S7, the controller PROC drives the servo motor 226 into rotation in its negative rotation direction, causing the tool magazine 210 to return to the storage position P2, as illustrated in FIG. 19. At step S8, the controller PROC controls the air pump AP to perform a pressurizing operation to cause the expandable seal 231 to expand, bringing the sealing device 230 into contact with the wall 22a (see FIG. 8).

At the storage position, the worker opens the outer door 22e and the magazine door 210e, as illustrated in FIG. 3. This enables the worker to take out the torch 30 that has been removed from the machining head 111 and give the torch 30 a checkup and/or cleaning. It is to be noted that the outer door 22e and the magazine door 210e (FIG. 3) each may be provided with a lock mechanism that locks the door when the tool magazine 210 is at other than the storage position P2 and that unlocks the door upon detecting that the tool magazine 210 is back at the storage position P2.

The foregoing motions have been performed for the purpose of storing in the tool magazine 210 the torch 30 mounted on the machining head 111. When motions are performed for the purpose of exchanging the torch 30 mounted on the machining head 111, the following control steps may be added between steps S6 and S7, which are illustrated in FIG. 11: "move the tool magazine 210 to the position of a newly mounted torch 30", "protrude the machining head 111 and mount the torch 30", and "withdraw the machining head 111".

Advantageous Effects of this Embodiment and User's Advantages

The torch 30 includes, in its laser emission path, an optical element such as a light concentration lens. Generally, when such torch 30 is stored, there is a possibility of the optical element contaminated by foreign matter. Even if the end portion of the laser emission path is covered by a protection window, there is a possibility of the protection window contaminated, preventing the laser beam or another source of heat from being transmitted and/or causing damage to the protection window itself. Also, even if the tool protection shutter 31j is provided, foreign matter attached to the tool protection shutter 31j may be allowed to enter the laser emission path by open-close motions of the tool protection shutter 31j, creating a possibility of the laser emission path contaminated. There is also a possibility of the tool protection shutter 31j itself damaged by foreign matter and/or a possibility of the tool protection shutter 31j being unable to open and close. In this embodiment, a movable mechanism for moving the torch 30 is not necessary in the tool magazine 210. This makes foreign matter less likely to occur in the tool magazine 210, eliminating or minimizing contamination of the torch 30 that is stored.

Also, the tool magazine 210 is movable between the storage position P2 and the exchange position P1. This ensures that by moving the machining head 111 to the home position HP, the torch 30 can be attached and detached to and from the machining head 111 or exchanged. Also, the tool magazine 210 includes the plurality of holders 217, which are disposed in the tool magazine 210 and aligned in the movement direction of the tool magazine 210. By moving the tool magazine 210 with a plurality of torches 30 contained in the tool magazine 210, the torches 30 can be attached and detached to and from the holders 217 or exchanged. This ensures that by changing the number of holders 217 to be contained in the tool magazine 210, the storage capacity of the torch 30 (an example of which is the maximum storable number of torches 30) is easily changeable, irrespective of the movable range of the machining head 111.

Also, the tool magazine 210 is movable to the exchange position. This ensures that it is not necessary for the machining head 111 to have a stroke equivalent to the distance over which the machining head 111 needs to move to enter the tool magazine 210; instead, it suffices that the first movement mechanism 120 has such stroke. Thus, the machining head 111 need not have a stroke to the storage position. Thus, it suffices that the first movement mechanism 120 has a minimal size (in particular, the total length of a guide rail 124a) necessary for machining, making the hybrid working machine 10 smaller in size and increasing the degree of layout freedom of the hybrid working machine 10.

Also in this embodiment, access to the storage region SR, in which torches are stored, from the in-machining region IR, in which machining is performed, can only be made through the access opening 22b. This minimizes scattering of foreign matter from the in-machining region IR to the storage region SR. Also, the shield plate 216 opens the access opening 22b only when the tool magazine 210 is at the exchange position. This eliminates the need for an opening and closing mechanism in the access opening 22b, which in turn makes the tool magazine 210 smaller in size and reduces the cost of the tool magazine 210. It is to be noted, however, that a shield plate that selectively opens and shields the access opening 22b may be provided, as described in the modification described later.

Also, by moving the tool magazine 210 between the storage position P2 and the exchange position P1, the tool magazine 210 at the storage position can be moved further away from the access opening 22b. This minimizes the possibility of foreign matter in the in-machining region attaching the torch 30.

Also, the worker may set the storage position P2 of the tool magazine 210 at, for example, a position accessible for the worker. This configuration enables the worker to more easily take out a torch 30 that is stored or mount a new torch 30 through the open outer door 22e and the open magazine door 210e. A conventional tool management system was to store precision tools such as torches in a tool magazine separate from a machining apparatus. The above configuration of this embodiment provides an advantageous improvement over the conventional tool management system in terms of economy of tool storage space, ease of management, and shortening of tool exchange time.

Also, the movement direction of the tool magazine 210 is an approximately vertical direction. This makes the tool storage 200 less influenced by the number of torches 30 that are stored, ensuring that the installation area of the tool storage 200 can be made smaller in size.

Also, the controller PROC controls the tool magazine drive mechanism 220 to move the tool magazine 210 to an exchange position corresponding to the position of each of the holders 217. Specifically, torches 30 are exchanged by moving the tool magazine 210 containing a plurality of torches 30. This ensures that as many torches 30 as possible can be stored, irrespective of the movable range of the machining head 111. Also, the access opening 22b, which is adjacent to the tool magazine 210, may have a minimal possible area necessary for exchange purposes. This makes foreign matter less likely to pass through the access opening 22b.

Through the supply port 210c, the tool magazine 210 takes in air sent from the clean air source CAS. Thus, the tool magazine 210 keeps the inside of the tool magazine 210 clean. Also, a flow of air from the inside of the tool magazine 210 toward the external environment is generated. This prevents the tool magazine 210 from being contaminated by external foreign matter.

Also, the tool storage 200 includes the sealing device 230. In the first state, the sealing device 230 moves apart from the circumference of the magazine opening 210a or from the wall 22a. In the second state, the sealing device 230 contacts the circumference of the magazine opening 210a and the wall 22a. While the tool magazine 210 is at the storage position, the expandable seal 231 seals the gap between the wall 22a and the tool magazine 210. This reliably prevents the inside of the tool magazine 210 from being contaminated by foreign matter, ensuring that the direction of air flow in the tool magazine 210 can be controlled. Also, by sealing the main outlet of air, the internal pressure of the tool magazine 210 is increased, ensuring that the inside of the tool magazine 210 is more reliably prevented from being contaminated by foreign matter.

When the tool magazine 210 is at the storage position, the sealing device 230 is in the first state, while when the tool magazine 210 is at other than the storage position, the sealing device 230 is in the second state. This ensures that the tool magazine 210 is not prevented from moving.

The tool magazine 210 includes the magazine door 210e on a surface of the tool magazine 210 different from the surface on which the magazine opening 210a is disposed. The tool magazine 210 and the tool magazine drive mechanism 220 are covered by the storage device cover 22. The storage device cover 22 includes the outer door 22e, which is disposed at a position at which the outer door 22e overlaps the magazine door 210e at the storage position. This ensures that the tools that are stored can be subjected to maintenance and/or exchanged without stopping the operation of the hybrid working machine or the machine tool.

The tool magazine 210 according to this embodiment is capable of storing the torch 30, which includes an optical element. Optical elements require high levels of cleanness in the storage atmosphere.

Figure 20:
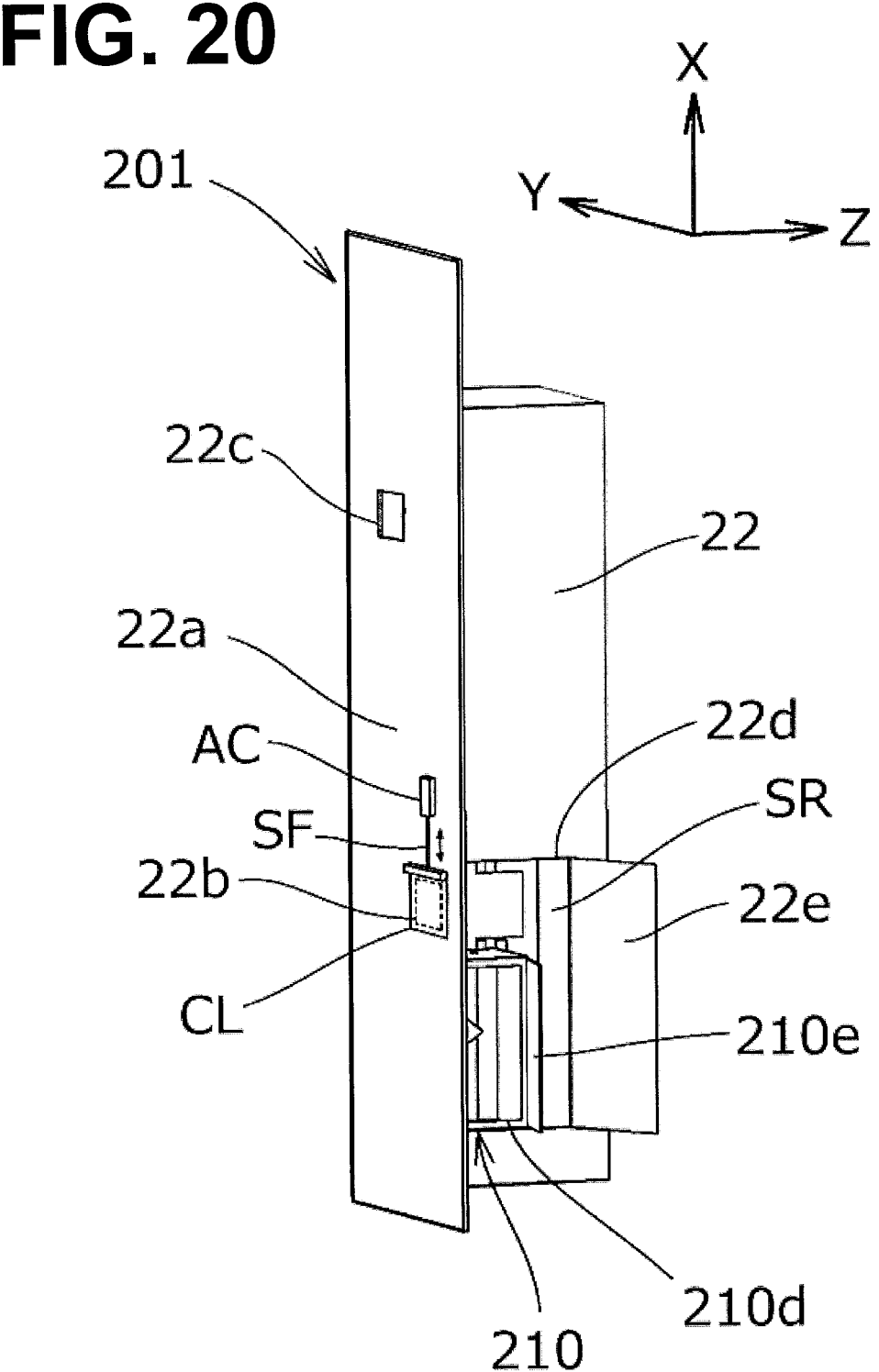
FIG. 20 is a perspective view of a modification of the above-described embodiment.

FIG. 20 is a perspective view, similar to FIG. 3, of a tool storage 201 according to a modification. In the tool storage 201 illustrated in FIG. 20, an air cylinder AC is mounted on the wall 22a near the access opening 22b. The air cylinder AC includes a shaft SF, which is extensible and contractible by air supplied from a pressure air source, not illustrated. An end portion of the shaft SF is connected to a shield plate CL, which shields the access opening 22b. The air cylinder AC is drivable into operation by a control signal from the controller PROC. Specifically, upon receipt of a closing signal from the controller PROC, the air cylinder AC extends the shaft SF, causing the access opening 22b to move to a position at which the shield plate CL is closed, as illustrated in FIG. 20. Upon receipt of an opening signal from the controller PROC, the air cylinder AC contracts the shaft SF, causing the shield plate CL in the state illustrated in FIG. 20 to withdraw upward, in the X axis direction. Thus, the access opening 22b is opened.

In this modification, while the controller PROC is keeping the tool magazine 210 at the storage position, the controller PROC transmits a closing signal to the air cylinder AC, causing the shield plate CL to keep the access opening 22b closed. This prevents foreign matter in the in-machining region IR from entering the storage region SR through the access opening 22b.

Contrarily, when the controller PROC has moved the tool magazine 210 to the exchange position, the controller PROC transmits an opening signal to the air cylinder AC, causing the shield plate CL to open the access opening 22*b*. This enables the machining head 111 to access the inside of the tool magazine 210. In this modification, it is not necessary to provide the shield plate 216. Also, the operation of the shield plate CL may not necessarily be controlled by an air cylinder but may be controlled by a motor, for example.

It is to be noted that the present invention will not be limited to the above-described embodiment and modification and is open to various other modifications. For example, a tool exchanger may not necessarily be mounted on the above-described hybrid working machine but may be mounted on a single additive manufacturing apparatus. Another possible example is that the tool exchanger is mounted on a machining apparatus other than an additive manufacturing apparatus.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present invention may be practiced otherwise than as specifically described herein.

What is claimed is:

1. A tool storage comprising:
   a tool magazine comprising a plurality of tool holders which are provided in the tool magazine and which are each configured to hold a respective tool;
   a magazine mover provided outside the tool magazine and configured to move the tool magazine in a linear moving direction between an exchange position at which the tool corresponding to a selected one of the plurality of tool holders is exchanged and a storage position at which the tool corresponding to the selected one of the plurality of tool holders is stored;
   a storage device cover provided to partition the tool magazine and the magazine mover from an in-machining region; and
   the plurality of tool holders being arrayed in the moving direction;
   wherein the tool magazine further comprising a magazine opening;
   wherein the storage device cover comprising a cover opening,
   wherein, when the tool magazine is in the exchange position, the tool magazine and the magazine opening thereof incurred movement in the moving direction such that the magazine opening overlaps the cover opening, thereby enabling the tool to he removed from the selected one of the plurality of tool holders, then moved through the magazine opening and the cover opening, and then moved into the in-machining region, and
   wherein, when the tool magazine is in the storage position, the tool magazine and the magazine opening thereof incurred movement in the moving direction such that the magazine opening does not overlap the cover opening.

2. The tool storage according to claim 1, further comprising:
   a controller configured to control the magazine mover to move the tool magazine to the exchange position such that the exchange position corresponds to a position of each of the plurality of tool holders.

3. The tool storage according to claim 2, further comprising:
   an air supplier configured to supply air to the tool magazine.

4. The tool storage according to claim 2, further comprising:
   a sealing device configured to move apart from a periphery of the magazine opening of the tool magazine or from a part of the storage device cover in a first state, and configured to contact the periphery of the magazine opening and the storage device cover in a second state.

5. The tool storage according to claim 4,
   wherein the sealing device comprises an expandable seal comprising an expandable and contractable material having a tubular shape, and
   wherein the sealing device is configured to change from the first state to the second state by introducing a fluid into the expandable seal, causing the expandable seal to be pressurized and expand.

6. The tool storage according to claim 1, further comprising:
   an air supplier configured to supply air to the tool magazine.

7. The tool storage according to claim 1, further comprising:
   a sealing device configured to move apart from a periphery of the magazine opening of the tool magazine or from a part of the storage device cover in a first state, and configured to contact the periphery of the magazine opening and the storage device cover in a second state.

8. The tool storage according to claim 2,
   wherein the sealing device comprises an expandable seal comprising an expandable and contractable material having a tubular shape, and
   wherein the sealing device is configured to change from the first state to the second state by introducing a fluid into the expandable seal, causing the expandable seal to be pressurized and expand.

9. The tool storage according to claim 1, wherein the tool magazine comprises a first door disposed on a first-door surface of the tool magazine different from a magazine-opening surface of the tool magazine on which the magazine opening is disposed.

10. The tool storage according to claim 9, wherein the storage device cover comprises a second door that overlaps the first door at the storage position of the tool magazine.

11. The tool storage according to claim 1, wherein the tool comprises
a laser emission path through which a laser beam is emitted, and
an optical element configured to concentrate the laser beam in the laser emission path.

12. The tool storage according to claim 11, wherein the tool further comprises a powder supply path through which metal powder is supplied toward an irradiated region irradiated with the laser beam.

13. The tool storage according to claim 7, further comprising:
an air supplier configured to supply air to the tool magazine.

14. The tool storage according to claim 1, wherein the tool magazine has a box shape.

15. A machine tool comprising:
the tool storage according to claim 1;
a machining head configured to perform machining with a tool mounted on the machining head;
a machining head mover configured to move the machining head;
a machine tool controller configured to control the machining head mover and further configured to control the magazine mover to move the tool magazine from the storage position to the exchange position.

16. The machine tool according to claim 15, wherein the machine tool controller is configured to control the machining head mover to make the machining head enter the tool magazine at the exchange position.

17. A hybrid working machine comprising:
the tool storage according to claim 1;
a machining head configured to perform laser machining with a laser machining tool mounted on the machining head;
a machining head mover configured to move the machining head;
a tool spindle configured to perform cutting with a cutting tool mounted on the tool spindle;
a tool spindle mover configured to move the tool spindle;
a controller configured to control the machining head mover and further configured to control the magazine mover to move the tool magazine from the storage position to the exchange position.

* * * * *